United States Patent
Asai

(10) Patent No.: US 7,821,672 B2
(45) Date of Patent: Oct. 26, 2010

(54) IMAGE RECORDING METHOD AND IMAGE RECORDING APPARATUS

(75) Inventor: Hiroshi Asai, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 601 days.

(21) Appl. No.: 11/902,562

(22) Filed: Sep. 24, 2007

(65) Prior Publication Data

US 2008/0074701 A1    Mar. 27, 2008

(30) Foreign Application Priority Data

Sep. 26, 2006   (JP)   ............................ P2006-260159

(51) Int. Cl.
    *G06K 15/00*   (2006.01)
(52) U.S. Cl. ........................ 358/3.09; 358/535; 347/131
(58) Field of Classification Search .................. None
    See application file for complete search history.

(56) References Cited

U.S. PATENT DOCUMENTS

| | | | |
|---|---|---|---|
| 4,680,645 A |   | 7/1987 | Dispoto et al. |
| 5,867,607 A | * | 2/1999 | Shibuya et al. ................ 358/1.9 |
| 5,923,774 A | * | 7/1999 | Ostromoukhov ............ 382/162 |
| 5,949,964 A | * | 9/1999 | Clouthier et al. ........... 358/3.06 |
| 6,404,508 B1 | * | 6/2002 | Ota et al. ...................... 358/1.9 |
| 6,870,645 B1 | * | 3/2005 | Schramm et al. ........... 358/3.14 |
| 7,286,266 B2 | * | 10/2007 | Fujita ........................ 358/3.06 |
| 7,321,447 B2 | * | 1/2008 | Kuiper ........................ 358/1.9 |
| 7,345,791 B2 | * | 3/2008 | Washio ...................... 358/3.13 |
| 7,471,421 B2 | * | 12/2008 | Asai et al. ................... 358/3.06 |
| 2003/0020935 A1 | * | 1/2003 | Morimatsu .................. 358/1.9 |
| 2004/0217972 A1 |   | 11/2004 | Deishi |

(Continued)

FOREIGN PATENT DOCUMENTS

EP    1 601 182    11/2005

(Continued)

OTHER PUBLICATIONS

European Search Report issued in European Patent Application No. EP 07116917.1-2202/1906647, dated Aug. 25, 2008.

(Continued)

*Primary Examiner*—King Y Poon
*Assistant Examiner*—Dung D Tran
(74) *Attorney, Agent, or Firm*—McDermott Will & Emery LLP

(57) ABSTRACT

In a printer, threshold matrixes are prepared so that, in a color halftone image generated with the threshold matrixes, cell centers are arranged randomly, a direction where intervals of cell centers for cyan are maximum and a direction where intervals of cell centers for magenta are maximum are different, and the both directions are tilted relatively to a column direction corresponding to a scan direction of a head. A check pattern is recorded with the threshold matrix for each color component by the head, print densities in positions in a width direction of the check pattern, which corresponds to an arrangement direction of outlets in the head, are measured to acquire modification coefficients and then pixel values of an original image are modified by using the modification coefficients. This makes it possible to print a color halftone image with less graininess, without causing a beat pattern and streak unevenness.

16 Claims, 16 Drawing Sheets

U.S. PATENT DOCUMENTS

| | | | |
|---|---|---|---|
| 2005/0179949 A1* | 8/2005 | Hagai | 358/3.03 |
| 2005/0264834 A1* | 12/2005 | Asai et al. | 358/1.9 |
| 2006/0007257 A1 | 1/2006 | Chiwata | |

FOREIGN PATENT DOCUMENTS

| | | |
|---|---|---|
| EP | 1 814 302 A2 | 8/2007 |
| JP | 2000-079710 | 3/2000 |
| JP | 3414325 | 4/2003 |
| JP | 2004-106248 | 4/2004 |
| JP | 2006-14271 | 1/2006 |

OTHER PUBLICATIONS

Baqai, Farhan A. et al., "Digital Color Halftoning: Problems algorithms and recent trends," IEEE Signal Processing Magazine, vol. 22, No. 1, Jan. 2005, pp. 87-96.

* cited by examiner

IMAGE RECORDING METHOD AND IMAGE RECORDING APPARATUS

BACKGROUND OF THE INVENTION

1. Field of the Invention

The present invention relates to a technique for recording a halftone image representing a color original image by comparing the original image with a threshold matrix for each color component.

2. Description of the Background Art

Conventionally used has been an inkjet printer provided with a head having a plurality of outlets, where the head moves relatively to a printing paper and printing is performed by controlling ON/OFF of ejection of fine droplet of ink from each outlet. Since a grayscale image to be written (hereinafter, referred to as "original image") has to be binarized in such a printer, a halftone image representing the original image is generated. In an AM (Amplitude Modulated) screening, gray levels are represented by changing the size of dots without changing the number of dots constituting the halftone image. In an FM (Frequency Modulated) screening, gray levels are represented by changing the number of dots of certain size, which are arranged appropriately (in a random fashion without extreme local difference in density).

In the inkjet printer, there is a case where a bleary line(s) (hereinafter, referred to as "streak unevenness") extending in a scan direction appears in a printed halftone image because of variations in amounts of ejection of fine droplets from the plurality of outlets, variations in directions of ejection, or the like. Japanese Patent Application Laid-Open No. 2004-106248 (Document 1) discloses a method of reducing streak unevenness, where a density measurement part is provided in a printer, a density of a region corresponding to each outlet in a pattern with a uniform density level (as a setting) which is printed by a head (hereinafter, the density is referred to as "the print density in the outlet") is acquired, and then each pixel value of an original image is modified on the basis of the print density in the outlet corresponding to the pixel value (i.e., the shading compensation is performed practically). In order to strictly acquire the print density in each outlet, the relationship of a recording resolution of the printer with regard to an arrangement direction of the outlets and a resolution of reading in the density measurement part (for example, a scanner) has to satisfy 1 to $\alpha$ ($\alpha$ is an integer which is 1 or more), however actually, even if such condition is not satisfied, a low-frequency unevenness can be roughly suppressed as long as the print density in the outlet is acquired with accuracy of a certain degree.

Japanese Patent Gazette No. 3414325 discloses a method of suppressing occurrence of streak unevenness which easily appears when printing is performed by recording only specific dots with a relatively small diameter in an inkjet printer. In the method, the specific dots and dots with a larger diameter than that of the specific dots are mixed at a meaningful rate in the printer. Also, Japanese Patent Application Laid-Open No. 2006-14271 discloses a method of suppressing graininess in a generated color halftone image, where threshold matrixes of color components are generated so that growing of halftone dot areas with increase of gray level in one color component shows different directional property from another color component.

In the case that dots are periodically arranged in the halftone image like in the AM screening, if it is tried to reduce streak unevenness by the method of Document 1, a pitch of dots in a pattern which is a halftone image for density measurement and a pitch of reading positions which is the reciprocal of resolution of scanner interfere and data of an image including interference unevenness of low frequency (i.e., the image including a beat pattern) is read out by the scanner. Thus, when each pixel value of the original image is modified on the basis of such image data, a beat pattern appears in the generated halftone image.

In the color halftone image, there is a problem that graininess easily appears in the image (that is to say, granularity of the image worsens) because of overlapping halftone images of a plurality of color components, and it is extremely difficult to achieve reduction of graininess and prevention of occurrence of streak unevenness and a beat pattern in the printed color halftone image.

SUMMARY OF THE INVENTION

The present invention is intended for an image recording method of recording a halftone image representing a color original image by comparing the original image with a threshold matrix for each color component in an image recording apparatus comprising a head having a plurality of dot output elements for recording dots to a plurality of dot recording positions, respectively, arranged in a width direction perpendicular to a predetermined scan direction on an object to be printed or an object used in printing and a scanning mechanism for moving the plurality of dot recording positions on the object relatively to the object in the scan direction. It is an object of the present invention to print a color halftone image with less graininess, without causing a beat pattern and streak unevenness.

The image recording method comprises the steps of: a) preparing a first threshold matrix of a first color component which is generated in a matrix area of the first color component by setting a plurality of first halftone cells based on a plurality of first base points and setting threshold values so that halftone dot areas grow in accordance with shapes of the plurality of first halftone cells with increase of gray level of the first color component, the matrix area of the first color component being defined in a column direction corresponding to the scan direction and a row direction corresponding to the width direction, intervals of the plurality of first base points being maximum with respect to a first direction tilted relatively to the column direction, the plurality of first base points being arranged randomly; b) preparing a second threshold matrix of a second color component which is generated in a matrix area of the second color component by setting a plurality of second halftone cells based on a plurality of second base points and setting threshold values so that halftone dot areas grow in accordance with shapes of the plurality of second halftone cells with increase of gray level of the second color component, the matrix area of the second color component being defined in the column direction and the row direction, intervals of the plurality of second base points being maximum with respect to a second direction which is tilted relatively to the column direction and is different from the first direction, the plurality of second base points being arranged randomly; c) recording a predetermined pattern on an object with use of the first threshold matrix by the head and measuring print densities in a plurality of positions in the width direction of the predetermined pattern on the object or a material printed by using the object, to acquire a plurality of first modification coefficients for the plurality of positions; d) recording a predetermined pattern on an object with use of the second threshold matrix by the head and measuring print densities in a plurality of positions in the width direction of the predetermined pattern on the object or a material printed by using the object, to acquire a plurality of second modification coefficients for the plurality of positions; e) modifying element values of the first threshold matrix or pixel values of the first color component in the original image by using the plurality of first modification coefficients; f) modifying element values of the second threshold matrix or pixel values of the second color component in the original image by using the plurality of second modification coefficients; g) performing output control of a plurality of dot output elements for the first color component in accordance with comparison results between respective pixel values of the first color component in the original image and element values of the first threshold matrix corresponding to the respective pixel values, while moving a plurality of dot recording positions for the first color component relatively to an object to be printed or an object used in printing in the scan direction; and h) performing output control of a plurality of dot output elements for the second color component in accordance with comparison results between respective pixel values of the second color component in the original image and element values of the second threshold matrix corresponding to the respective pixel values, while moving a plurality of dot recording positions for the second color component relatively to the object in the scan direction.

According to the present invention, it is possible to print a color halftone image with less graininess, without causing a beat pattern and streak unevenness.

Preferably, an angle formed between the column direction and each of the first direction and the second direction is equal to or larger than 15 degrees and an angle formed between the first direction and the second direction is equal to or larger than 30 degrees. More preferably, an angle formed between the column direction and each of the first direction and the second direction is 45 degrees. It is thereby possible to decrease a degree of modification of the threshold matrix or the original image and surely reduce graininess in the halftone image.

According to a preferred embodiment of the present invention, each of the plurality of dot output elements for each color component can form a plurality of dots having different sizes, and each element value of the first threshold matrix and the second threshold matrix is a set of sub-element values used for determination of a size of a dot. This makes it possible to prevent occurrence of streak unevenness which appears in a case that dots in a printed halftone image have a uniform size.

The present invention is also intended for an image recording apparatus for recording a halftone image representing a color original image by comparing the original image with a threshold matrix for each color component.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
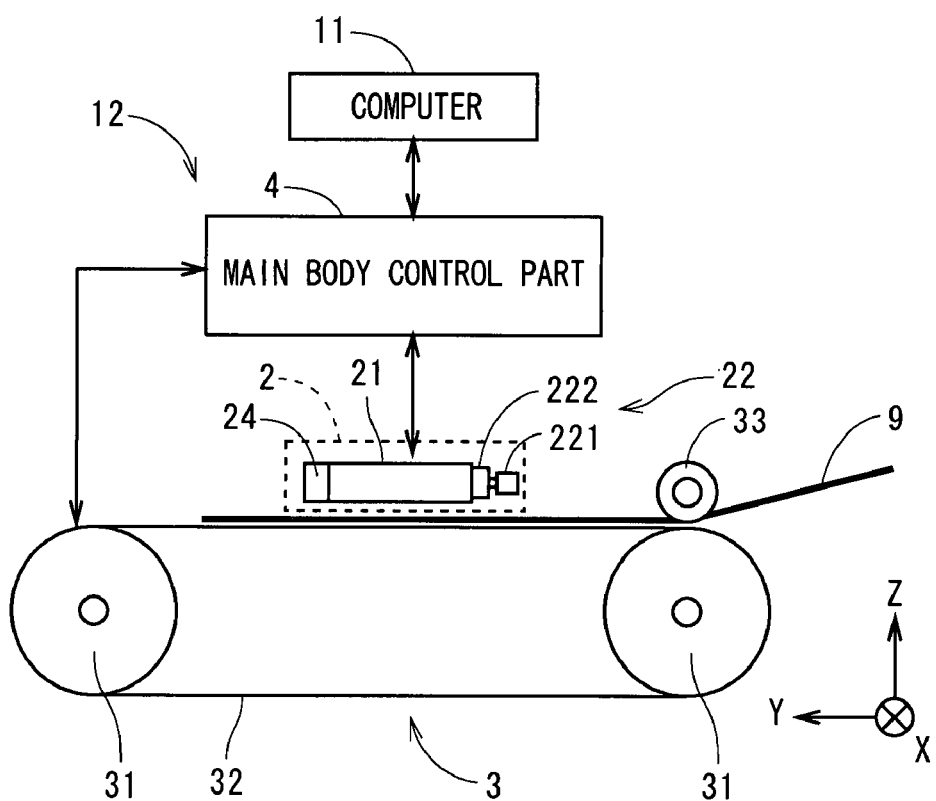
FIG. 1 is a view showing a construction of an inkjet printer.

FIG. 1 is a view showing a construction of an inkjet printer 1 in accordance with one preferred embodiment of the present invention. The printer 1 is an image recording apparatus for recording images of a plurality of color components on a printing paper 9 where the images are overlapped on the printing paper 9. A main body 12 of the printer 1 comprises an ejection part 2 for ejecting fine droplets of ink onto the printing paper 9, a feeder 3 for moving the printing paper 9 toward the Y direction of FIG. 1 under the ejection part 2, and a main body control part 4 connected to the ejection part 2 and the feeder 3. A computer 11, which has a CPU for performing various computations, a memory for storing various information and the like, is connected to the main body control part 4. In the printer 1, the main body 12 receives a signal from the computer 11 and prints a color halftone image on the printing paper 9. An object to be printed in the printer 1 may be a film or the like other than the printing paper 9.

The feeder 3 has two belt rollers 31 connected to a not-shown motor and a belt 32 hanging between the two belt rollers 31. The printing paper 9 is roll paper which is continuous paper with a predetermined width. The printing paper 9 is guided onto the belt 32 through a roller 33 positioned above the belt roller 31 on the (−Y) side to be held thereon and moves toward the (+Y) side together with the belt 32, passing under the ejection part 2. One belt roller 31 of the feeder 3 is provided with an encoder (not shown). The feeder 3 may have a construction where a suction part is provided at a position opposite to the ejection part 2 inside the loop-like belt 32 and very small suction holes are formed on the belt 32, to hold the printing paper 9 on the belt 32 by suction.

A head 21 having a plurality of modules arranged in the Y direction is provided in the ejection part 2 and each module can eject ink of one of a plurality of colors. As discussed later, a plurality of outlets each of which ejects droplets of ink onto the printing paper 9 (toward the (−Z) direction in FIG. 1) are arranged in the X direction in each module. A line sensor 24 for reading an image printed by the head 21 is attached on the (+Y) side of the head 21, and the line sensor 24 has a plurality of light receiving elements (for example, CCD (Charge Coupled Devices)) arranged in the Y direction. The ejection part 2 comprises a head moving mechanism 22 for moving the head 21 in a direction perpendicular to a scan direction of the head 21 and along the printing paper 9 (the direction is the X direction in FIG. 1 and corresponds to the width of the printing paper 9, and the direction is hereinafter referred to as "width direction"). The head moving mechanism 22 is provided with a loop-like timing belt 222 which is long in the X direction, a motor 221 reciprocally moves the timing belt 222 and the head 21 smoothly moves in the width direction. While printing is not performed in the printer 1, the head moving mechanism 22 disposes the head 21 at a predetermined home position and the plurality of outlets in the head 21 are closed with lib members at the home position, to prevent the outlets from being blocked by drying of the ink in the vicinities of the outlets. Though the head 21 ejects ink of black, cyan, and magenta in the preferred embodiment for convenience of description, ink of other color components such as yellow may be ejected in the printer 1.

Figure 2:
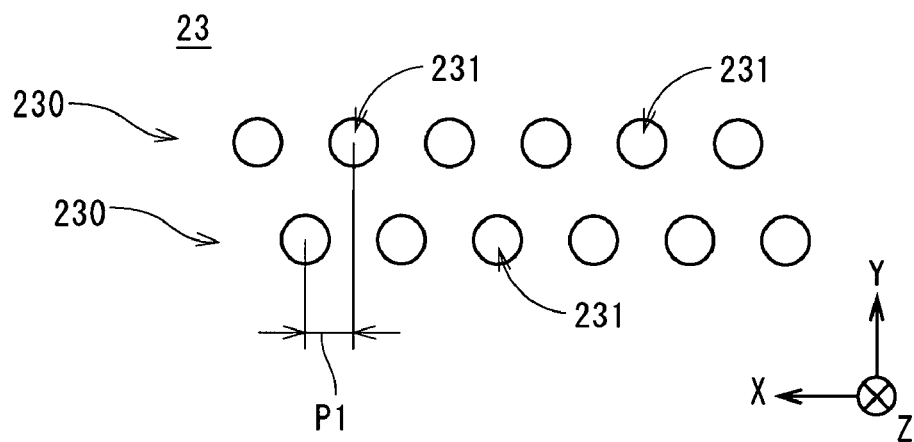
FIG. 2 is a view showing an outlet group of a module.

FIG. 2 is a view showing an outlet group of one module in the head 21. Though the following discussion will be made on only the module for ejecting ink of one of the plurality of colors ejected by the head 21, the modules for ejecting ink of other colors have the same construction.

As shown in FIG. 2, the module 23 has two outlet rows 230 arranged in the Y direction (scan direction) in each of which the plurality of outlets 231 are arranged in the X direction (width direction). In each outlet row 230, the plurality of outlets 231 are arranged at a regular pitch toward the width direction in a plane parallel to the printing paper 9 (the plane parallel to the XY plane). In the module 23, the plurality of outlets 231 are disposed in two-row staggered arrangement so that one of the outlets 231 in one outlet row 230 is positioned at the center between two adjacent outlets 231 in the other outlet row 230 with respect to the width direction. Therefore, in one module 23, the plurality of outlets 231 are arranged at a regular pitch P1 with respect to the width direction (for example, the pitch is 35 micrometers (μm) corresponding to 720 dpi (dot per inch) and hereinafter also referred to as "ejection pitch P1"). Actually, the plurality of outlets 231 are arranged so as to cover the entire printing area on the printing paper 9 with respect to the width direction (i.e., to cover the range which is equal to or wider than the effective print area on the printing paper 9).

Figure 3:
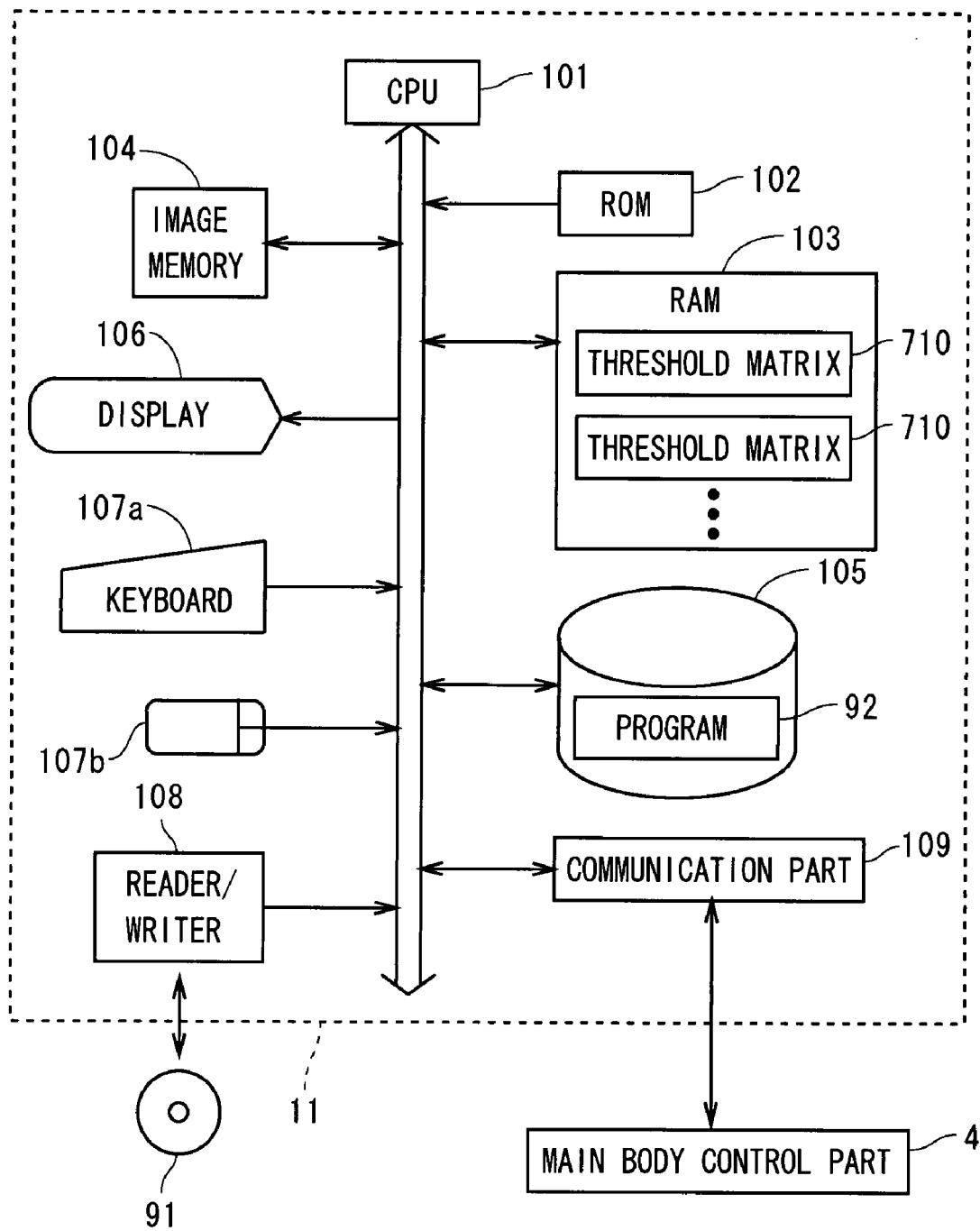
FIG. 3 is a view showing a structure of a computer.

As shown in FIG. 3, the computer 11 has a structure of general computer system where a CPU 101 for performing various computations, a ROM 102 for storing a basic program and a RAM 103 for storing various information are connected to a bus line. To the bus line, an image memory 104 for storing data of a color image (that is to say, each pixel in the image has pixel values of the plurality of color components and hereinafter, the image is referred to as "original image") to be represented by halftone dots (halftoning), a fixed disk 105 for storing information, a display 106 for displaying various information, a keyboard 107a and a mouse 107b for receiving an input from an operator, a reader/writer 108 which reads information from a computer-readable recording medium 91 such as an optical disk, a magnetic disk or a magneto-optic disk and writes information into the recording medium 91, and a communication part 109 for making communications with the main body control part 4 are further connected through interfaces (I/F) as appropriate.

In the computer 11, a program 92 is read out from the recording medium 91 through the reader/writer 108 in advance and stored in the fixed disk 105. The program 92 is copied in the RAM 103, the CPU 101 performs a computation according to the program 92 in the RAM 103 (that is, the computer 11 executes the program), and the computer 11 generates a later-discussed threshold matrix (SPM (Screen Pattern Memory) data) 710 for formation of halftone dots for each color component and operates as an operation part for acquiring later-discussed modification coefficients used in printing. The threshold matrixes 710 and the data of the color original image stored in the image memory 104 are transmitted to the main body control part 4 through the communication part 109.

Figure 4:
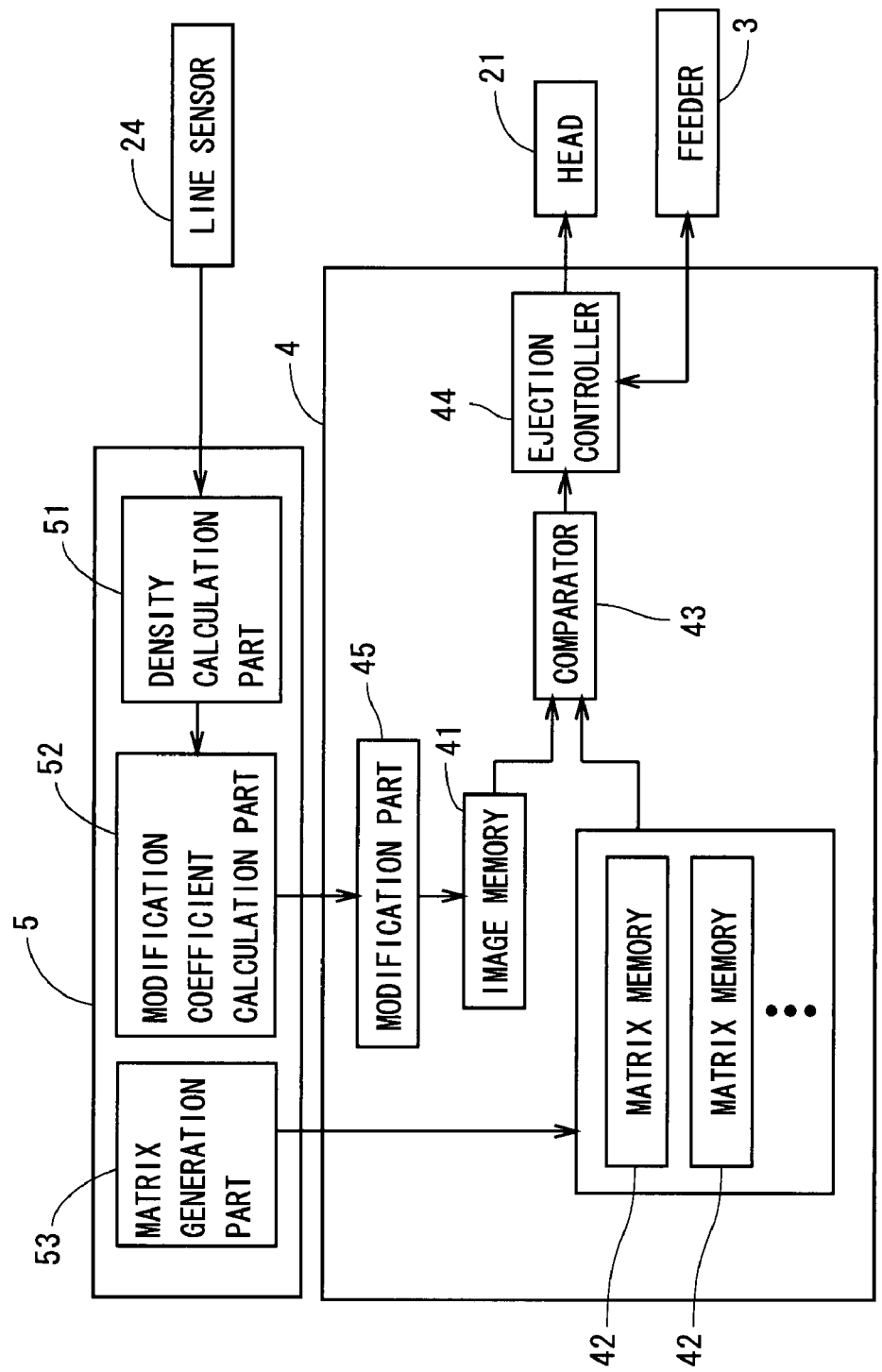
FIG. 4 is a block diagram showing a functional constitution of the printer.

FIG. 4 is a block diagram showing a functional constitution of the printer 1. Functions of a density calculation part 51, a modification coefficient calculation part 52, and a matrix generation part 53 in an operation part 5 in FIG. 4 are achieved by the computer 11. The main body control part 4 has an image memory 41 for storing the data of the color original image, a plurality of matrix memories 42 (SPM (Screen Pattern Memories)) for respectively storing the threshold matrixes 710 of the plurality of color components generated in the operation part 5, a comparator 43 (halftoning circuit) for comparing the original image with the threshold matrix 710 for each color component, an ejection controller 44 for controlling ejection of ink from the plurality of outlets 231 of the head 21 in synchronization with movement of the printing paper 9 relative to the head 21, and a modification part 45 for modifying a pixel value (pixel values of the plurality of color components) of each pixel in the original image stored in the image memory 41.

Next discussion will be made on an operation for printing an image in the printer 1 with reference to FIG. 5. When the printer 1 prints an image on the printing paper 9, first, a predetermined pre-printing process is performed as preparation (Step S11). Actually, in the pre-printing process, the threshold matrix 710 is stored in the matrix memory 42 for each color component, and a plurality of modification coefficients of each color component which are used for modification of the original image are acquired and stored in the modification coefficient calculation part 52. The pre-printing process is performed, for example, as a regular calibration in use of the printer 1 or the like, and the detail will be discussed after description of the whole printing operation.

Figure 6:
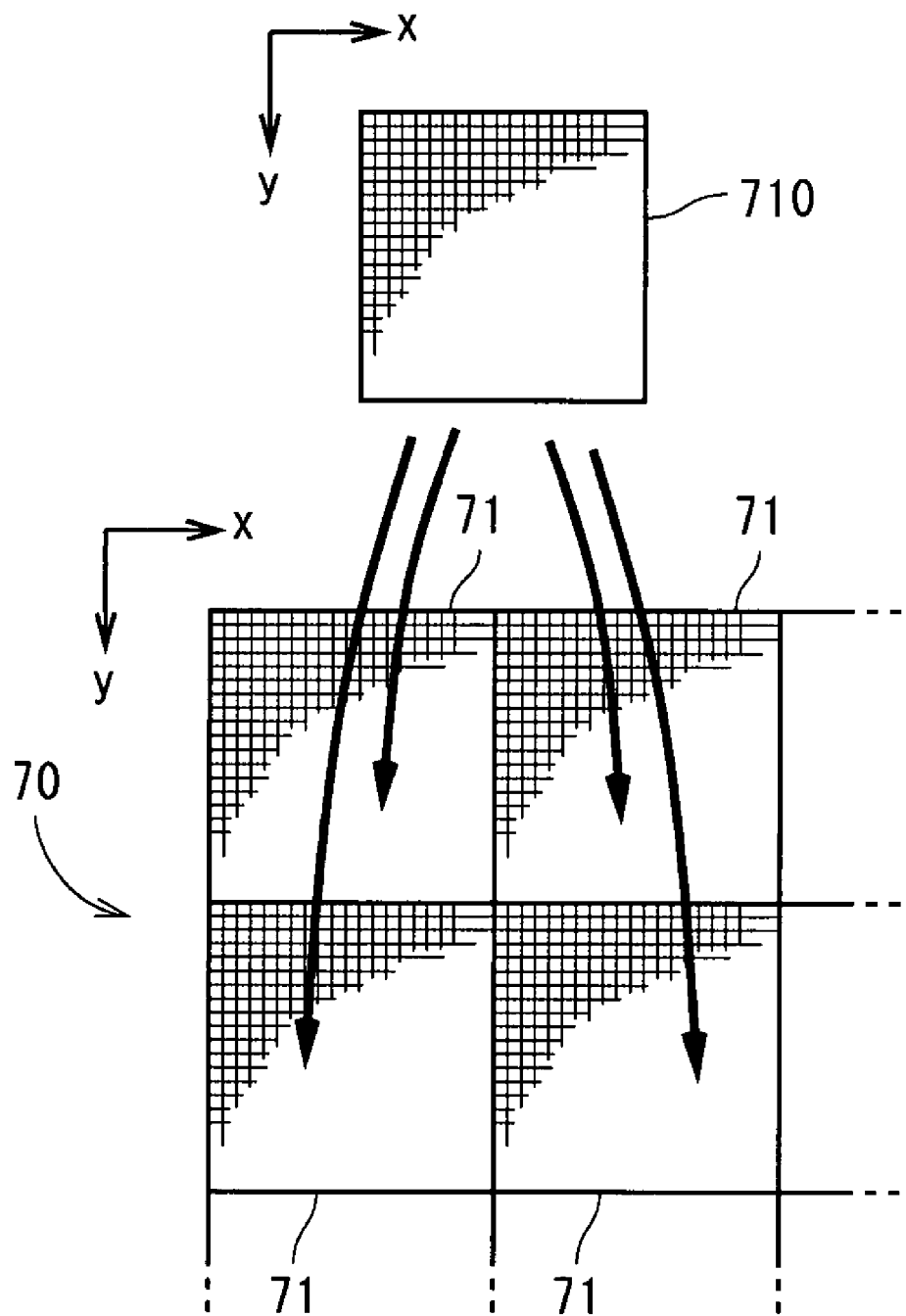
FIG. 6 is a view abstractly showing an original image and a threshold matrix.

Subsequently, the color original image is inputted to the image memory 41 of the main body control part 4 from the computer 11 and stored therein (Step S12). FIG. 6 is a view abstractly showing an original image 70 and a threshold matrix 710 of one color component. In each of the original image 70 and the threshold matrix 710, a plurality of pixels or a plurality of elements are arranged in a column direction corresponding to the scan direction (the column direction is shown as the y direction in FIG. 6) and a row direction corresponding to the width direction (the row direction is shown as the x direction in FIG. 6). In the following description, the original image is represented at a gray level of 0 to 255 in each color component, in all the respects other than specifically indicated.

After the original image 70 is stored in the image memory 41, the plurality of modification coefficients stored in the modification coefficient calculation part 52 are outputted to the modification part 45 and each pixel value of respective components of black, cyan, and magenta in the original image 70 stored in the image memory 41 is modified (Steps S13*a*, S13*b*, S13*c*). In this time, one modification coefficient for each color component corresponds to each position in the row direction in the original image 70, and values of all pixels in the original image 70 stored in the image memory 41 are modified for each color component by multiplying a pixel value of each color component in each pixel of the original image 70 by the modification coefficient of the color component corresponding to the pixel value in the modification part 45. As discussed later, since there is a case where element values of the threshold matrix are modified, Steps S13*a*, 13*b*, and 13*c* in FIG. 5 show the contents of processes in both the modification of the original image and the modification of the threshold matrix.

After the original image 70 is modified (i.e., the modified original image is obtained), a color halftone image representing the original image 70 is generated by comparing the original image 70 with the threshold matrix 710 for each color component. Here, halftoning of the original image 70 is discussed conceptually. In halftoning of the original image 70, as shown in FIG. 6, the original image 70 is divided into a large number of areas having the fixed size and repeat areas 71 each of which serving as a unit in halftoning are set. Each matrix memory 42 has a memory area corresponding to one repeat area 71 and an element value is set to each address (coordinates) of the memory area to store the threshold matrix 710. Conceptually, each repeat area 71 of the original image 70 and the threshold matrix 710 for each color component are superposed and a pixel value of the color component of each pixel in the repeat area 71 is compared with an element value in the threshold matrix 710 corresponding to the pixel value, to thereby determine whether or not writing (formation of a dot of the color) should be performed on the position of the pixel on the printing paper 9.

Actually, a pixel value of one pixel in the original image is read out with respect to each color component from the image memory 41, on the basis of an address signal outputted from an address generator of the comparator 43 in FIG. 4. An address signal representing a position in the repeat area corresponding to the pixel in the original image is also generated in the address generator, one element value in the threshold matrix 710 of each color component is specified and read out from the matrix memory 42. The pixel value from the image memory 41 and the element value from the matrix memory 42 are compared for each color component to determine a pixel value of the position (address) of the pixel in a binary outputted image of each color component. Therefore, looking at one color component, in the original image 70 shown in FIG. 6, for example, a pixel value "1" is assigned (i.e., a dot is set) at each position where a pixel value is larger than the element value of the threshold matrix 710 corresponding to the pixel values, and a pixel value "0" is assigned (i.e., a dot is not set) at each of remaining pixels, to generate the binary outputted image as the halftone image of the above color component.

In the printer 1 of FIG. 1, the head 21 moves to a predetermined printing position in the X direction from the home position by driving the head moving mechanism 22 in parallel with the above process for halftoning. When a portion of the halftone image (for example, the portion corresponding to a plurality of repeat areas 71 at the end on the (+y) side) which is first printed is generated for each color, continuous movement toward the scan direction of the printing paper 9 is started by the feeder 3 which is driven by the main body control part 4 and in parallel with the above process for halftoning (generation process of the halftone image), ejection of ink from the plurality of outlets 231 included in each module 23 is controlled by the ejection controller 44 in synchronization with movement of the printing paper 9 relative to the head 21.

Since the halftone image is printed on the printing paper 9, the plurality of pixels in the halftone image are considered to be arranged on the printing paper 9. The plurality of positions in the row direction in the halftone image of each color component are individually (one by one) associated with the plurality of outlets 231 in the module 23 for the color component. Hence, in the ejection controller 44, in synchronization with movement of the printing paper 9 relative to the head 21, when a pixel value in the halftone image corresponding to an ejection position of each outlet 231 on the printing paper 9 is "1", a dot is formed on the ejection position, and when the pixel value in the halftone image is "0", a dot is not formed on the ejection position. In this way, with respect to each component of black, cyan, and magenta, ejection of ink from the plurality of outlets 231 is controlled in accordance with comparison results between the pixel values (precisely, modified pixel values) of the original image 70 at the ejection positions of the plurality of outlets 231 relative to the printing paper 9 and the element values of the threshold matrix 710 corresponding to the pixel values, while moving the plurality of ejection positions on the printing paper 9 which individually correspond to the plurality of outlets 231 relatively to the printing paper 9 in the scan direction.

In the printer 1, an operation for recording a halftone image of black on the printing paper 9 while generating the halftone image (Step S14*a*), an operation for recording a halftone image of cyan on the printing paper 9 while generating the halftone image (Step S14*b*), and an operation for recording a halftone image of magenta on the printing paper 9 while generating the halftone image (Step S14*c*) are performed in parallel to print a color halftone image representing the color original image on the printing paper 9. After the whole halftone image is printed on the printing paper 9, movement of the printing paper 9 toward the scan direction is stopped and the head moving mechanism 22 moves the head 21 to the home position, to complete the printing operation in the printer 1.

Next, discussion will be made on the pre-printing process performed as preparation of the printing operation in the printer with reference to FIG. 7. In the pre-printing process, first, the threshold matrixes 710 of black, cyan and magenta which are stored in the computer 11 are outputted to the main body control part 4 and they are respectively stored and prepared in the corresponding matrix memories 42 (Steps S21*a*, S21*b*, S21*c*). A technique of generating the threshold matrixes 710 of black, cyan and magenta used in the printer 1 and their characteristics will be described in detail after discussion of the pre-printing process.

After the threshold matrixes 710 are stored in the matrix memories 42, the head 21 of FIG. 1 moves to the printing position. By generating a halftone image from an image with a uniform gray level with use of the threshold matrix 710 of black, a predetermined check pattern of black is printed on the printing paper 9. Also, a check pattern of cyan is printed on the printing paper 9 by generating a halftone image from the image with use of the threshold matrix 710 of cyan, and a check pattern of magenta is printed by generating a halftone image from the image with use of the threshold matrix 710 of magenta.

Figure 8:
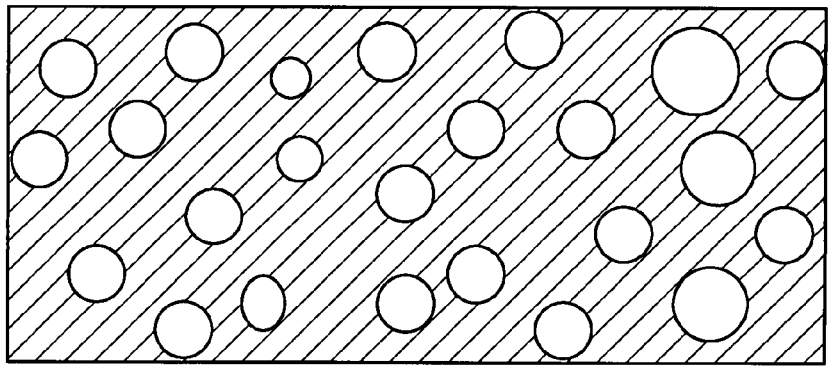
FIG. 8 is a view abstractly showing a check pattern of black.

FIG. 8 is a view abstractly showing the check pattern of black printed on the printing paper 9. Each of the check patterns of black, cyan and magenta which are formed side by side in the Y direction on the printing paper 9 is a liner pattern extending across the almost entire printing area on the printing paper 9 with respect to the width direction, and it is formed with use of all outlets 231 included in the corresponding module 23 where the check pattern shows a halftone image generated from the image with the uniform gray level with use of the threshold matrix 710, as discussed above (for example, the halftone image is a tint image with a density corresponding to tone values of 75% or 100%).

The check patterns on the printing paper 9 move to a position under the line sensor 24, the head 21 is moved in the (+X) direction by the head moving mechanism 22, and thereby each check pattern is read out over the whole in the width direction by the plurality of light receiving elements of the line sensor 24, which are arranged in the scan direction. Though the following discussion will be made on only the check pattern of one color, the check pattern of each of the other colors is processed in the same manner.

Figure 9:
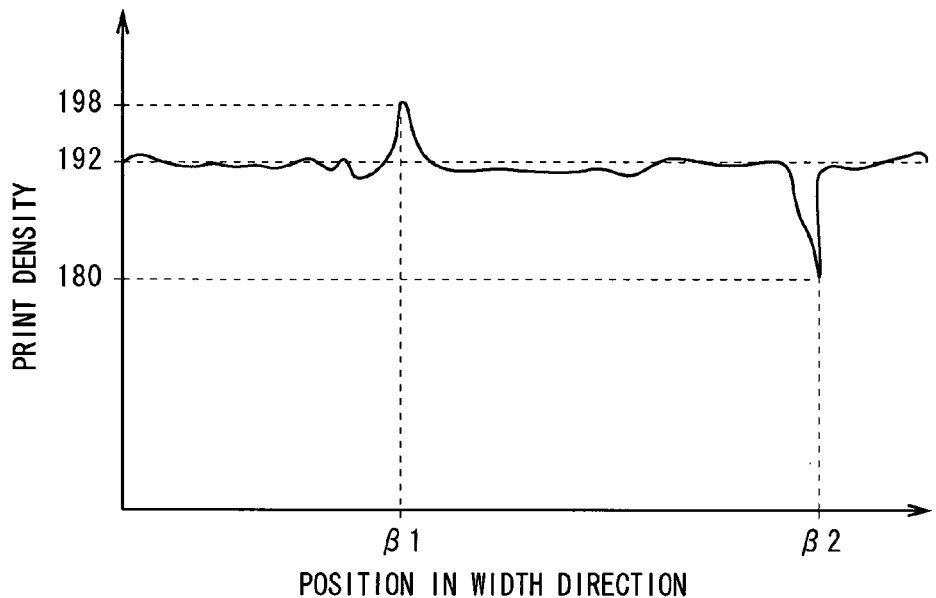
FIG. 9 is a graph showing print densities in a width direction of a check pattern.

After image data of the check pattern is acquired by the line sensor 24, an average value of pixel values in each position in (a direction corresponding to) the width direction of the image representing the check pattern (i.e., an average density of a scan line which is a group of pixels arranged in (a direction corresponding to) the scan direction) is obtained as a print density in the position of the check pattern. FIG. 9 is a graph showing print densities in respective positions in the width direction of the check pattern. The image representing the check pattern is expressed at a gray level of 0 to 255.

Subsequently, a modification coefficient (Coeff) for each position in the width direction is obtained by Eq. 1 in the modification coefficient calculation part 52, where $H_{AVE}$ is an average value of print densities in a plurality of positions (typically all positions) in the width direction, a is a standard deviation of the print densities, and $H_i$ is a print density in the position in the width direction. In Eq. 1, a is a positive constant.

$$\text{Coeff}=255/(255+(H_i-H_{AVE})/\pi\times a) \qquad \text{Eq. 1}$$

For example, in a case where the average value of the print densities is 192 and the standard deviation is 1.5, the modification coefficient (Coeff) obtained by Eq. 1 is smaller than 1 at a position β1 in FIG. 9 where the print density is 198 (i.e., the print density is higher than the average value). As described above, since the width direction on the printing paper 9 corresponds to the row direction of the original image 70 and the pixel value of each pixel in the original image 70 is multiplied by the modification coefficient of the position in the width direction corresponding to the pixel in Steps S13a to S13c of FIG. 5, modification where a pixel value becomes smaller is performed on a pixel group (a plurality of pixels arrange in the column direction) in the original image 70 corresponding to the position β1. At a position β2 of FIG. 9 where the print density is 180 (i.e., the print density is lower than the average value), since the modification coefficient (Coeff) obtained by Eq. 1 is greater than 1, modification where a pixel value becomes larger is performed on a pixel group in the original image 70 of positions in the row direction corresponding to the position β2. With this operation, the shading compensation is practically performed on the original image 70, and occurrence of streak unevenness extending in the scan direction caused by variations in the outlets 231 of the head 21 or the like is prevented in the halftone image recorded on the printing paper 9 in the above Steps S14a to 14c.

As discussed above, respective check patterns of black, cyan, and magenta are printed in the printer 1, the density calculation part 51, the modification coefficient calculation part 52 and the line sensor 24 cooperate as a modification coefficient acquisition part, and the plurality of modification coefficients of each of black, cyan, and magenta are acquired by measuring the print densities (Steps S22a, S22b, S22c). Then, the modification coefficients of each color component are stored in the modification coefficient calculation part 52 and the pre-printing process is completed.

Next, discussion will be made on a technique of generating the threshold matrixes used in the printer 1 with reference to FIG. 10. Generation of the threshold matrix of black is described first and generation of the threshold matrixes of cyan and magenta will be described later.

Figure 11:
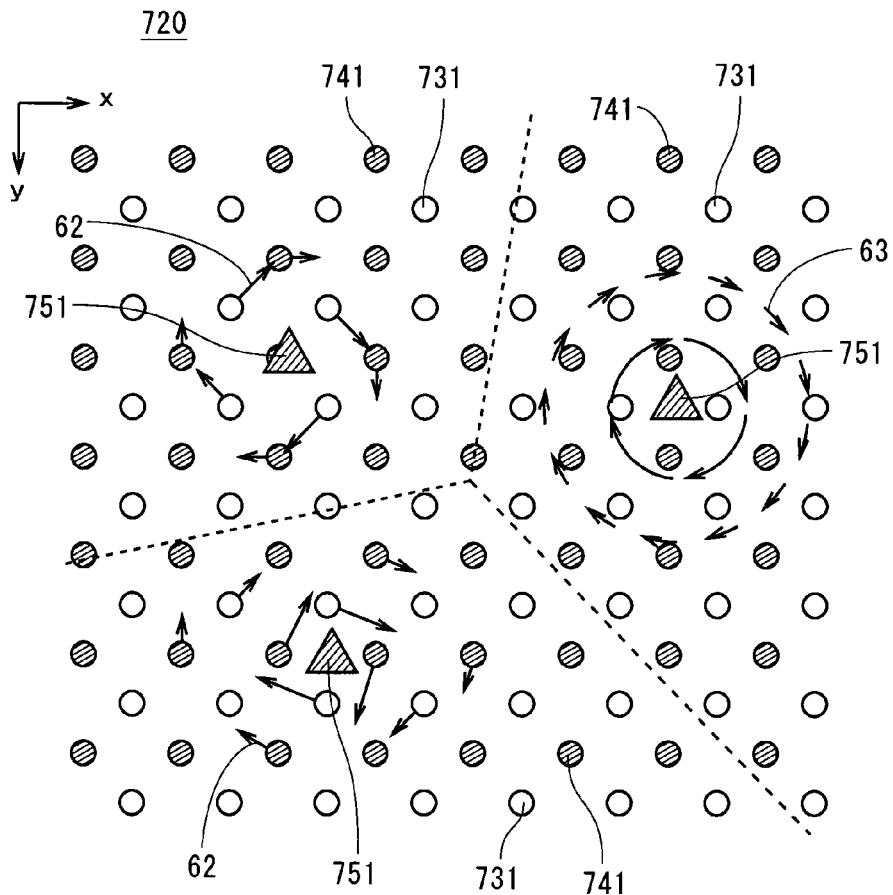
FIG. 11 is a view showing reference points superposed on cell centers arranged in the matrix area.

The matrix generation part 53 first sets a matrix area which is used for storing the threshold matrix of black and is defined in the column direction corresponding to the scan direction and the row direction corresponding to the width direction, and centers of halftone cells (each of which is a so-called seed and hereinafter referred to as "cell center") are regularly arranged in the matrix area. Each halftone cell serves as a unit of an area for forming a halftone dot. In the present embodiment, highlight-side dot cells in each of which a dot-like halftone dot area changes in response to change in the highlight side gray level of the original image and shadow-side dot cells in each of which a mesh-like halftone dot area changes (i.e., blank dot-like area changes) in response to change in the shadow side gray level are provided, and as shown in FIG. 11, a plurality of highlight-side cell centers 731 and a plurality of shadow-side cell centers 741 are regularly arranged in the row direction (the x direction in FIG. 11) and the column direction (the y direction in FIG. 11) at the same pitch in the matrix area 720.

Subsequently, reference points 751 whose number is fairly smaller than that of the cell centers 731 and 741 are arranged in the matrix area 720 almost uniformly in a random fashion by a predetermined technique. At this time, since the matrix area 720 corresponds to the repeat area 71 shown in FIG. 6, each reference point 751 is considered to be repeated both in the horizontal and vertical directions. The nearest reference point 751 is specified for each cell center included in the plurality of highlight-side cell centers 731 and the plurality of shadow-side cell centers 741 in consideration of repeat of the matrix area 720. In FIG. 11, with respect to the cell centers 731 and 741 included in each of areas which are partitioned by broken lines, the reference point 751 included in the same area is specified as the nearest one, and each area may be considered as a territory of the reference point 751 included in the area.

The matrix generation part 53 calculates the distance between each of the cell centers 731 and 741 and the nearest reference point 751 (in consideration of repeat of the matrix area 720). Then, a rotation angle with respect to each of the cell centers 731 and 741 is obtained by a predetermined calculation, the cell centers 731 and 741 are rotated around the nearest reference point 751 in the same rotation direction, and fluctuation is given to the arrangement of the cell centers 731 and 741. At this time, the rotation angle with respect to each of the cell centers 731 and 741 becomes smaller as the distance between the cell center 731 or 741 and the nearest reference point 751 becomes longer. In the upper left and lower left areas of FIG. 11, shorter arrows 62 which are farther from the reference point 751 indicate that the rotation angle with respect to each of the cell centers 731 and 741 becomes smaller as the distance between the cell center and the nearest reference point 751 becomes longer. In the upper right area, arrows 63 conceptually indicate that the rotation angle of each cell center becomes smaller as the distance between the cell center and the reference point 751 becomes longer.

Subsequently, uniformity in distribution of the plurality of highlight-side cell centers 731 and the plurality of shadow-side cell centers 741 in the matrix area 720 is improved by using a Voronoi tessellation and movement of the cell centers toward the barycenters of the divided areas when necessary. By the above operation, setting of the cell centers 731 and 741 for black which are arranged almost uniformly in a random fashion in the matrix area 720 is completed (Step S31). Intervals of the cell centers 731 and those of the cell centers 741 are almost isotropic property, and the cell centers 741 are arranged among the cell centers 731.

Figure 12:
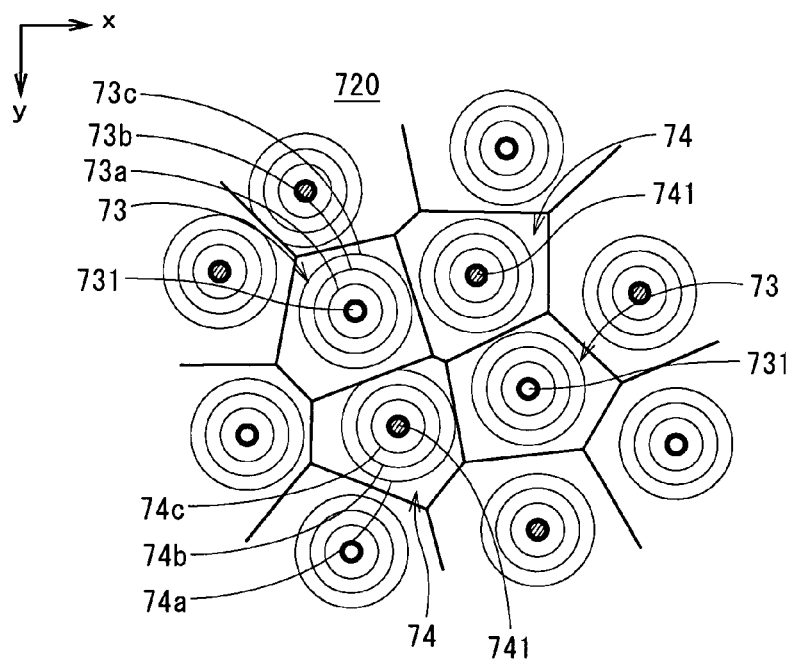
FIG. 12 is a view showing a state where halftone cells are set.

After the cell centers 731 and 741 being almost uniformly distributed are set, halftone cells each serving as a unit for creation of halftone dots are set in the matrix area 720 around each of the cell centers 731 and 741 (Step S32). FIG. 12 is a view showing a state where polygonal halftone cells 73 and 74 are set around the cell centers 731 and 741, respectively, and a highlight-side halftone cell 73 corresponds to the highlight-side cell center 731 and a shadow-side halftone cell 74 corresponds to the shadow-side cell center 741. The halftone cells 73 and 74 are set in the matrix area 720 in consideration of repeat of the matrix area 720 both in the horizontal and vertical directions.

Setting of the halftone cells is performed, for example, in the following manner. First, in order to determine which one of the cell centers 731 and 741a position in the matrix area 720 belongs to, the square of the distance between the position and each of the cell centers 731 and 741 is obtained as an evaluation value. In calculation of the evaluation value for one cell center 731 or 741 (hereinafter, referred to as "specified cell center"), one out of a plurality of specified cell centers in consideration of repeat of the matrix area 720 both in the horizontal and vertical directions, which is closest to the specified position, is selected as an object for calculation of the evaluation value. Then, it is determined that this position should belong to the cell center 731 or 741 which has the smallest evaluation value. By performing the above calculation for all the positions, the matrix area 720 is divided into halftone cells 73 and 74 around the cell centers 731 and 741, and a plurality of halftone cells 73 and 74 are set in the matrix area 720 at random in irregular shapes, as shown in FIG. 12.

After setting of the halftone cells 73 and 74, with respect to each of all the positions in each of the halftone cells 73 and 74, the distance between the position and the cell center 731 or 741 of the halftone cell 73 or 74 including the position is obtained as the first-stage evaluation value. Numbers of integer which increase by 1 are sequentially assigned to all the positions in the halftone cell 73 or 74, from one having the smallest first-stage evaluation value, and the number is divided by the total number of positions constituting the halftone cell 73 or 74, to obtain the second-stage evaluation value (ranging from 0.0 to 1.0) which is normalized by the size of the halftone cell, which is now assigned. This allows a smaller evaluation value to be assigned to a position closer to the cell center 731 or 741.

Next, with respect to each of the shadow-side halftone cells 74, the second-stage evaluation value is changed to a value obtained by subtracting the second-stage evaluation value from 2. This gives evaluation values each ranging from 2.0 to 1.0 to the positions in the shadow-side halftone cells 74, and the second-stage evaluation value becomes larger as the position is closer to the shadow-side cell center 741. As a result, the normalized second-stage evaluation values each ranging from 0 to 2.0 are assigned to the positions of all the halftone cells (Step S33). Numbers of integer which increase by 1 are sequentially assigned all the positions in the matrix area 720, from one having the smallest second-stage evaluation value, and the numbers of order that pixels in the halftone image are included in the halftone dot areas in accordance with increase in gray level of the original image are set to all the positions in the matrix area 720. In the matrix area 720 with the numbers of order, if the number of gray levels is N, the numbers of order each of which is changed to a value within a range from 0 to (N−1) are assigned to all the positions as threshold values (Step S34).

In the halftone cells 73 and 74 in the matrix area 720 shown in FIG. 12, illustrated is change in size of respective halftone dot areas to be formed in the halftone cells 73 and 74 with change in the gray level of the original image. With the above setting of the threshold values, in the highlight-side halftone cells 73 as shown by lines 73a to 73c, the dot-like halftone dot area grows from the cell center 731 toward a peripheral portion according to increase in the highlight-side gray level of the original image, and a mesh-like pattern is formed by connected dots. In the shadow-side halftone cells 74 as shown by lines 74a to 74c, the halftone dot area grows from a peripheral portion toward the cell center 741 according to increase in the shadow-side gray level (the blank dot-like area deflates).

In FIG. 12, since the first-stage evaluation value for each position is obtained as the distance between the position and the cell center 731 or 741, the boundary of each halftone dot area has a (perfect) circular shape as indicated by the lines 73a to 73c or 74a to 74c. With respect to respective halftone cells 73 and 74, since the halftone dot areas do not become larger than the corresponding halftone cells 73 and 74, the halftone dot areas in the matrix area 720 vary with change in gray level in accordance with shapes of the halftone cells 73 and 74.

Figure 13:
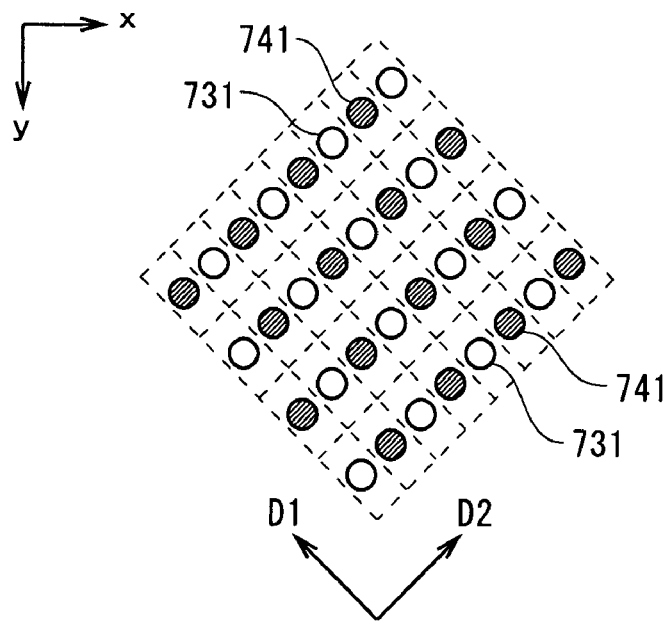
FIG. 13 is a view showing another arrangement of cell centers.

Next discussion will be made on generation of the threshold matrix of cyan. After the matrix generation part 53 sets the matrix area for cyan which is defined in the row and column directions, the highlight-side cell centers 731 and the shadow-side cell centers 741 are alternately arranged in two directions, i.e., D1 (a first direction) and D2 (a second direction) orthogonal to each other, each of which forming an angle of 45 degrees with the row direction (the x direction) or the column direction (the y direction) as shown in FIG. 13. At this time, the cell centers 731 and 741 are arranged in a right-upward direction (a counterclockwise direction at an angle of 45 degrees from the right-horizontal direction) indicated by the arrow D2 of FIG. 13 at certain intervals shorter than the intervals in a left-upward direction (a counterclockwise direction at an angle of 135 degrees from the right-horizontal direction) indicated by the arrow D1.

Subsequently, like in the case of black, reference points 751 (see FIG. 11) are arranged in the matrix area 720 almost uniformly in a random fashion, the number of which are sufficiently smaller than that of cell centers 731 and 741, and the nearest reference point 751 is specified in consideration of repeat of the matrix area 720 with respect to each of the cell centers. The cell centers 731 and 741 are rotated around the nearest reference point 751 in the same rotation direction, and the rotation angle with respect to each of the cell centers 731 and 741 becomes smaller as the distance between the one of the cell centers 731 and 741 and the nearest reference point 751 is longer. With the above operation, a plurality of cell centers 731 and a plurality of cell centers 741 are arranged in the matrix area 720 almost uniformly in a random fashion so that an average of intervals of the cell centers 731 and 741 should become smallest in the direction D2 and become largest in the direction D1 orthogonal to the direction D1 (Step S31). Actually, a plurality of highlight-side cell centers 731 and a plurality of shadow-side cell centers 741 which are used as base points for generation of the threshold matrix in the matrix area 720 are arranged almost in a random fashion at a density higher than that for black.

After setting of the cell centers 731 and 741 which are distributed almost uniformly with directional property, setting of the halftone cells 73 and 74 with reference to (around) the cell centers 731 and 741 is performed by the same technique as the case for black (Step S32). Since the cell centers 731 and 741 which are base points are arranged in the direction D2 more densely than in the direction D1, the highlight-side and shadow-side halftone cells 73 and 74 each have a shape which is flatter in the direction D2, in other words, elongated in the direction D1 as shown in FIG. 14.

Subsequently, the distance (vector) between each of all the positions in the halftone cell 73 or 74 and the cell center 731 or 741 of the halftone cell 73 or 74 including the position is multiplied by 2 in the direction D2 to obtain the first-stage evaluation value. Numbers of integer which increase by 1 are sequentially assigned to all the positions in the halftone cell 73 or 74, from one having the smallest first-stage evaluation value, and the number is divided by the total number of positions constituting the halftone cell 73 or 74, to obtain the second-stage evaluation value (ranging from 0.0 to 1.0) which is normalized by the size of the halftone cell, which is now assigned. This allows almost equal second-stage evaluation values to be present in a shape of ellipse as shown in FIG. 14, and a smaller evaluation value to be assigned to a position closer to the cell center 731 or 741.

Next, with respect to each of the shadow-side halftone cells 74, the second-stage evaluation value is changed to a value obtained by subtracting the second-stage evaluation value from 2, and the normalized second-stage evaluation values each ranging from 0 to 2.0 are assigned to the positions of all the halftone cells (Step S33). Numbers of integer which increase by 1 are sequentially assigned all the positions in the matrix area 720, from one having the smallest second-stage evaluation value, and the numbers of order each of which is changed to a value within a range from 0 to (N−1) are assigned to all the positions as threshold values in accordance with the number of gray levels N of the original image (Step S34).

Figure 14:
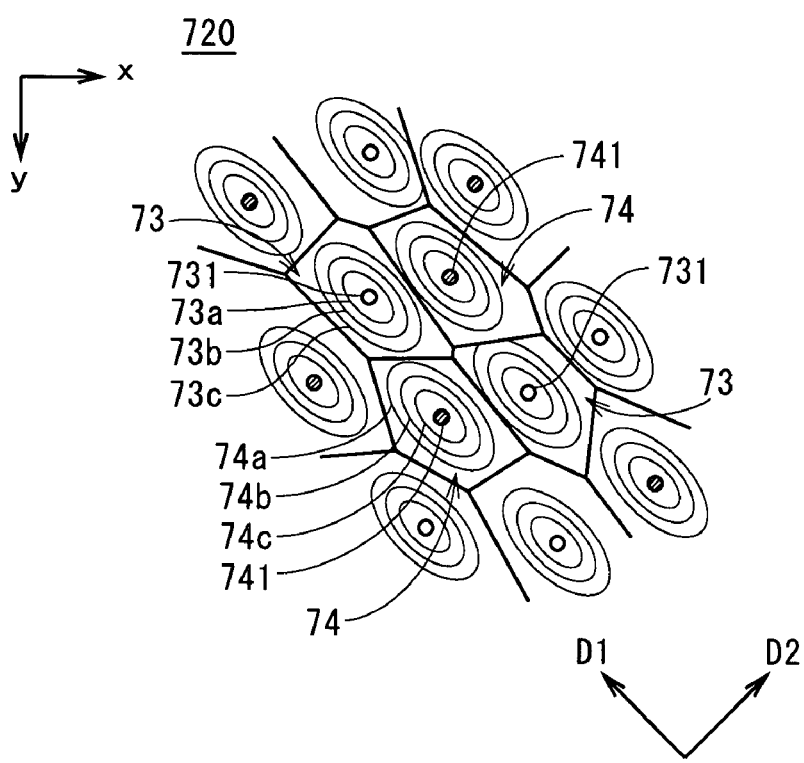
FIG. 14 is a view showing a state where halftone cells are set.

Like FIG. 12, FIG. 14 also illustrates change in size of respective halftone dot areas to be formed in the halftone cell 73 and 74 with change in the gray level of the original image, and with the above setting of the threshold values, in the highlight-side halftone cells 73 as shown by lines 73a to 73c, the dot-like elliptical halftone dot area grows from the cell center 731 toward a peripheral portion according to increase in the highlight-side gray level of the original image, and a mesh-like pattern is formed by connected dots. In the shadow-side halftone cells 74 as shown by lines 74a to 74c, the halftone dot area grows from a peripheral portion toward the cell center 741 according to increase in the shadow-side gray level (the blank elliptical dot-like area deflates). Thus, each halftone dot area varies in accordance with the shape of the halftone cell 73 or 74 with change in gray level in the matrix area 720.

Figure 15:
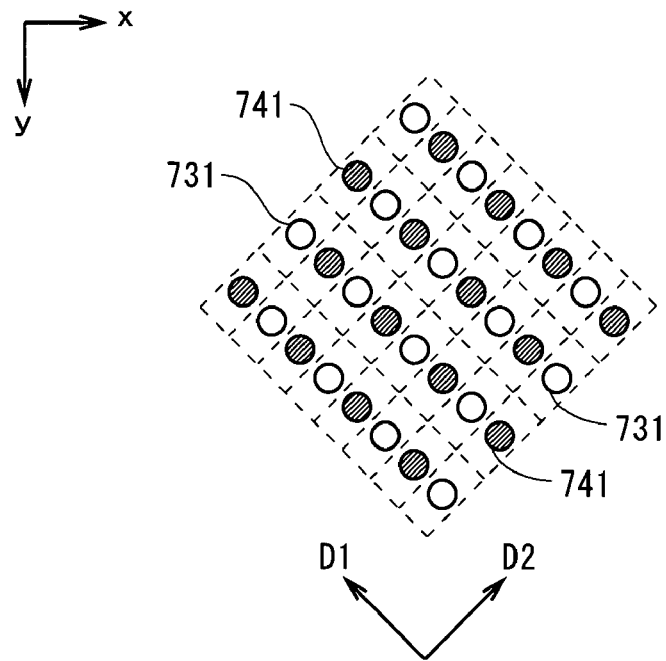
FIG. 15 is a view showing still another arrangement of cell centers.

Next discussion will be made on generation of the threshold matrix of magenta. After the matrix generation part 53 sets the matrix area for magenta which is defined in the row and column directions, the highlight-side cell centers 731 and the shadow-side cell centers 741 are alternately arranged in two directions D1 and D2 orthogonal to each other, each of which forming an angle of 45 degrees with the row direction (the x direction) or the column direction (the y direction) in the matrix area for magenta as shown in FIG. 15. The cell centers 731 and 741 are arranged in a left-upward direction indicated by the arrow D1 at certain intervals shorter than the intervals (half the intervals) in a right-upward direction indicated by the arrow D2, and the density of the cell centers 731 is the same as that in the case of cyan. In summary, the cell centers for magenta are arranged in such a manner that the arrangement of the cell centers for cyan is rotated at an angle of 90 degrees.

Subsequently, like in the case of cyan, setting of the reference points 751 and rotation of the cell centers 731 and 741 are performed (see FIG. 11), and thus a plurality of cell centers 731 and a plurality of cell centers 741 are arranged in the matrix area 720 almost uniformly in a random fashion so that an average of intervals of the cell center 731 or 741 should become smallest in the direction D1 and become largest in the direction D2 (Step S31). With the above operation, the intervals of the cell centers 731 and those of the cell centers 741 each have directional property different from that for cyan by 90 degrees, and cell centers 741 are arranged among the cell centers 731 and the respective densities are the same as those in the case of cyan.

After setting of the cell centers 731 and 741 which are distributed almost uniformly with directional property, setting of the halftone cells 73 and 74 with reference to (around) the cell centers 731 and 741 is performed by the same technique as the case for cyan (Step S32). Since the cell centers 731 and 741 which are base points are arranged in the direction D2 more densely than in the direction D1, the highlight-side and shadow-side halftone cells 73 and 74 each have a shape which is flatter in the direction D1, in other words, elongated in the direction D2.

Subsequently, the distance (vector) between each of all the positions in the halftone cell 73 or 74 and the cell center 731 or 741 of the halftone cell 73 or 74 including the position is multiplied by 2 in the direction D1 to obtain the first-stage evaluation value, and the first-stage evaluation value is normalized to obtain the second-stage evaluation value (ranging from 0.0 to 1.0), which is assigned to each of all the positions. This allows almost equal second-stage evaluation values to be present in a shape of ellipse like a reversed case of FIG. 14, and a smaller evaluation value to be assigned to a position closer to the cell center 731 or 741.

Next, with respect to each of the shadow-side halftone cells 74, the second-stage evaluation value is changed to a value obtained by subtracting the second-stage evaluation value from 2, and the normalized second-stage evaluation values are assigned to the positions of all the halftone cells (Step S33). The numbers of order each of which is changed to a value within a range from 0 to (N−1) are assigned to all the positions in the matrix area 720 as threshold values in accordance with the number of gray levels N of the original image (Step S34).

With the above setting of the threshold values, in the highlight-side halftone cells 73, the dot-like elliptical halftone dot area grows from the cell center 731 toward a peripheral portion according to increase in the highlight-side gray level of the original image, and a mesh-like pattern is formed by connected dots. In the shadow-side halftone cells 74, the halftone dot area grows from a peripheral portion toward the cell center 741 according to increase in the shadow-side gray level (the blank elliptical dot-like area deflates). Thus, each halftone dot area varies in accordance with the shape of the halftone cell 73 or 74 with change in gray level in the matrix area 720.

Figure 16:
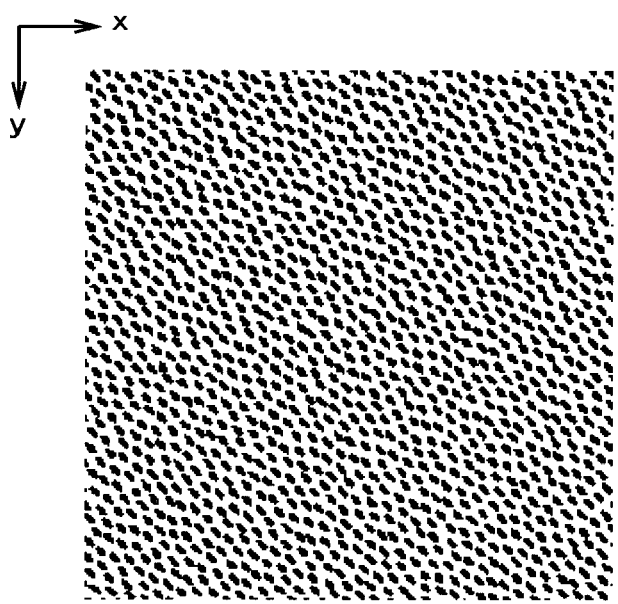
FIGS. 16 and 17 are views each showing a tint image.
Figure 17:
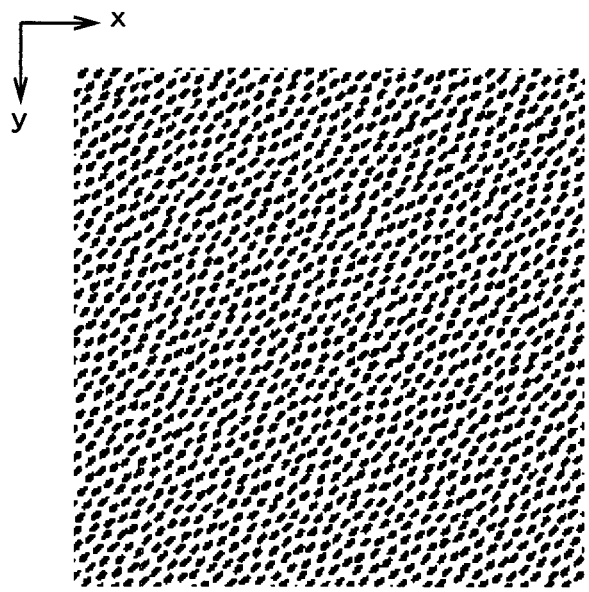

FIGS. 16 and 17 are views showing halftone tint images each having a uniform gray level of 30%, which are generated by using the threshold matrixes of cyan and magenta, respectively. As shown in FIG. 16, in the halftone tint image of cyan, the dot-like areas are elongated in a left-upward direction (direction D1), and as shown in FIG. 17, in the halftone tint image of magenta, the dot-like areas are elongated in a right-upward direction (direction D2). In other words, the density of a plurality of cell centers 731 in the halftone tint image of cyan and that of a plurality of cell centers 731 in the halftone tint image of magenta are almost equal to each other. In the halftone tint image of cyan, the intervals of a plurality of cell centers 731 are maximum with respect to the direction D1 and the growth of a plurality of dot-like areas in accordance with increase in gray level is maximum in the direction D1. In the halftone tint image of magenta, the intervals of a plurality of cell centers 731 are maximum with respect to the direction D2 and the growth of a plurality of dot-like areas with increase of gray level is maximum in the direction D2. Though not shown, however, the intervals of a plurality of cell centers 731 for black has almost isotropic property, the halftone dot density is smaller than (e.g., 0.7 times) those of cyan and magenta and the growth of a plurality of dot-like areas in accordance with increase in gray level also has almost isotropic property.

Figure 7:
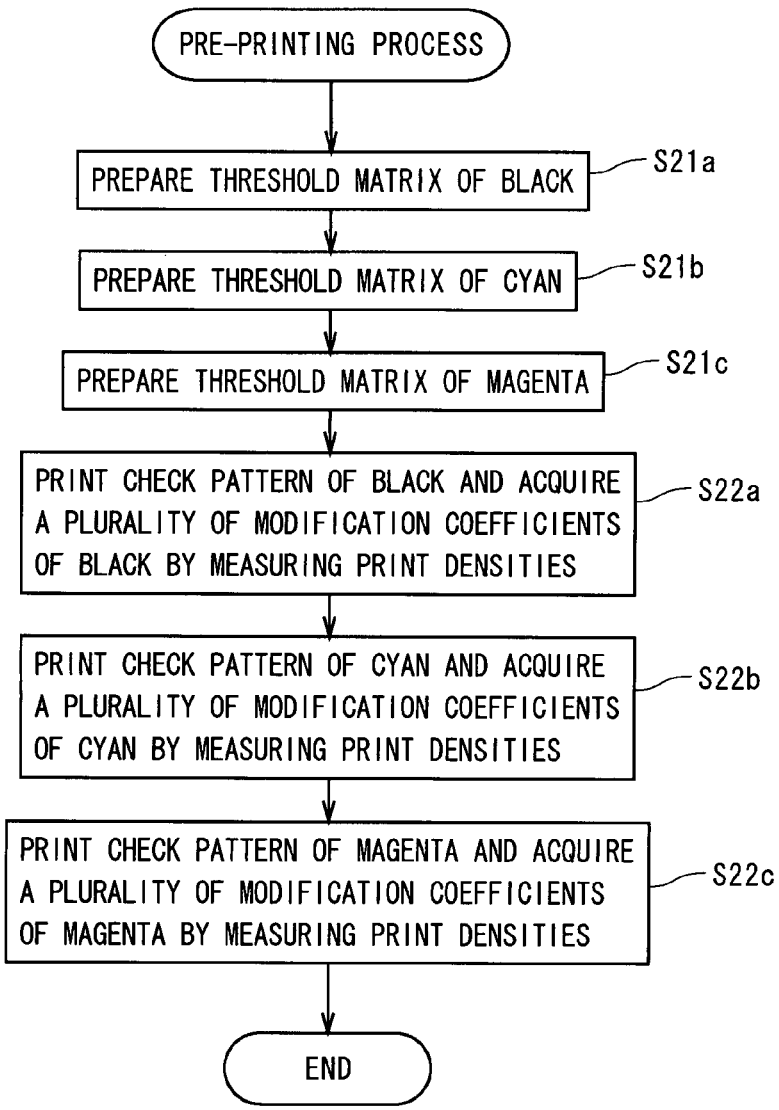
FIG. 7 is a flowchart showing a flow of pre-printing process.

After generation of the threshold matrixes of black, cyan and magenta is completed with the above operations, setting of the threshold matrixes in the matrix memories 42 of FIG. 4 is performed (FIG. 7: Steps S21*a* to S21*c*) and the threshold matrixes are used in the pre-printing process and the actual printing of an image (FIG. 7: Steps S22*a* to S22*c*, FIG. 5: Steps S12, S13*a* to S13*c*, S14*a* to S14*c*).

Figure 18:
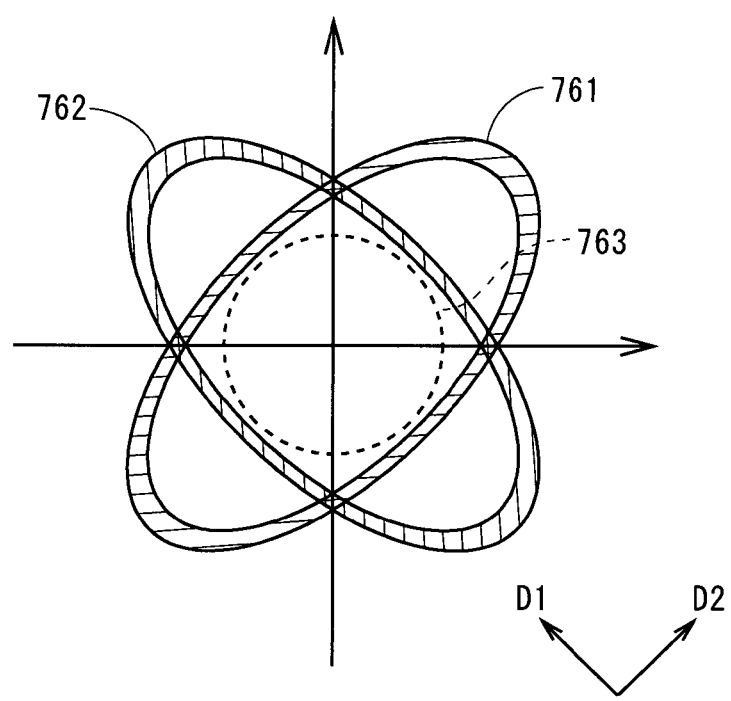
FIG. 18 is a view showing a characteristic of spatial frequency of halftone dots.

Next, discussion will be made on the characteristic features of the halftone images created with use of the above threshold matrixes. In FIG. 18, reference numeral 761 represents the characteristic of spatial frequency (spectrum) of the halftone image of cyan and reference numeral 762 represents the characteristic of spatial frequency of the halftone image of magenta. As discussed earlier, in the threshold matrix for cyan, since the cell centers 731 and 741 are arranged at smaller intervals in the direction D2 and at larger intervals in the direction D1, higher values indicating periodicity are distributed in the elliptical ring-like area 761 which is elongated in the direction D2 in the frequency space. In the threshold matrix for magenta, since the cell centers 731 and 741 are arranged at smaller intervals in the direction D1 and at larger intervals in the direction D2, higher values indicating periodicity are distributed in the elliptical ring-like area 762 which is elongated in the direction D1 in the frequency space.

As a result, the directions where the respective periodicities approximate to each other in the halftone images of cyan and magenta are limited to intersections of the areas 761 and 762, and it is therefore possible to suppress an unpleasant low-frequency unevenness causing graininess in an image obtained by superposing the two halftone images. As for the halftone image of black, however, since it has almost isotropic property at low screen ruling, the characteristic of frequency appears in a small annular shape as indicated by the broken line 763 in FIG. 18. Since the directions where the characteristic of frequency for black approximates to those for cyan and magenta are partially present but are limited, both when the halftone images of black and cyan are superposed and when the halftone images of black and magenta are superposed, it is possible to suppress graininess in an image obtained by superposing these halftone images.

Figure 19:
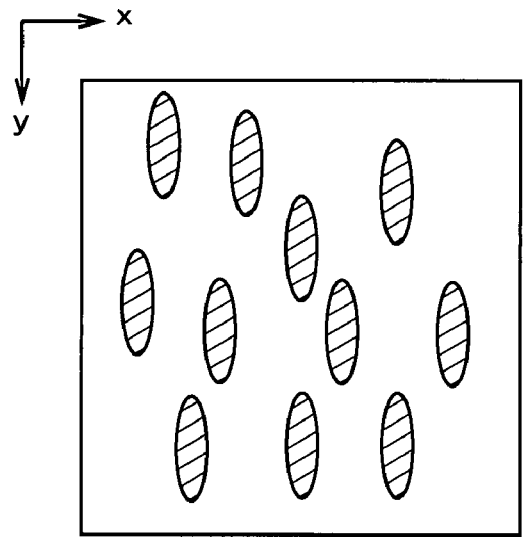
FIG. 19 is a view abstractly showing a check pattern of a comparison example.

Next, discussion will be made on a relationship between the threshold matrix of cyan (and magenta) and modification of the original image on the basis of print densities. FIG. 19 is a view abstractly showing a check pattern with a predetermined gray level which is generated by using a threshold matrix of cyan in accordance with a comparison example. Since a plurality of cell centers are arranged in the matrix area for cyan of the comparison example so that an average of intervals of the cell centers should become smallest in the row direction (x direction) and become largest in the column direction (y direction), dot-like areas each have a shape which is elongated in the column direction in the check pattern of FIG. 19 and streak unevenness easily appears. Therefore, when modification of the pixel values in the original image is performed on the basis of a plurality of print densities in the width direction of the check pattern, modification coefficients for positions of streak unevenness become large and consequently, a degree of modification of the pixel values corresponding to the position in the original image is made larger. Since reproduction of the original image in the generated halftone image becomes worse as the degree of modification of the pixel values in the original image is larger, it is preferable that the degree of modification is made smaller as much as possible.

Figure 10:
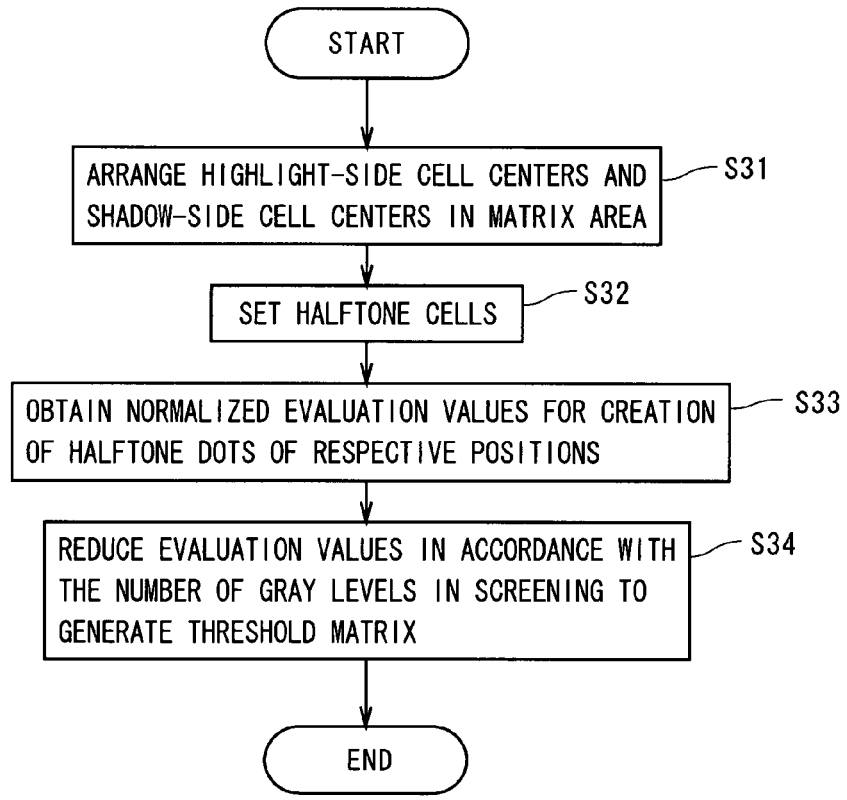
FIG. 10 is a flowchart showing a process flow for generating the threshold matrix.
Figure 20:
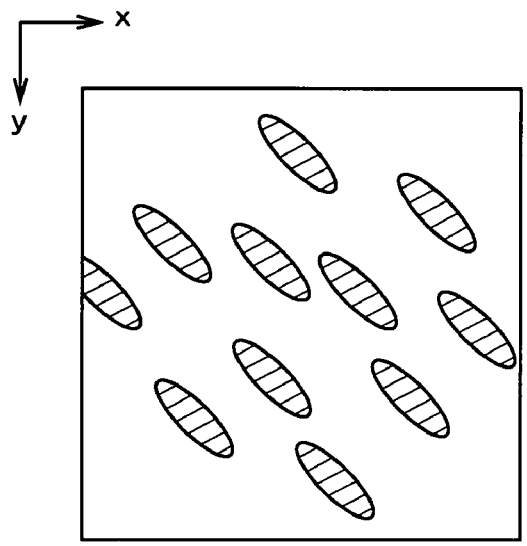
FIG. 20 is a view abstractly showing a check pattern.

On the other hand, as discussed above, the plurality of cell centers 731 and 741 are arranged in the matrix area of cyan generated in the process shown in FIG. 10 so that the average of intervals of the cell centers 731 and 741 should become largest in the direction D1 and become smallest in the direction D2 orthogonal to the direction D1, and in the check pattern with a predetermined gray level generated with the above threshold matrix, dot-like areas each have a shape being elongated in the direction D1 which is counterclockwise tilted by 45 degrees relatively to the column direction as shown in FIG. 20. Therefore, streak unevenness in the check pattern of FIG. 20 does not easily appear and the degree of modification of the pixel values in the original image is smaller than that in the case of the threshold matrix of the comparison example. As a result, it is possible to suppress the degree of modification of the original image and suppress degradation of the halftone image (the same as in magenta) in the printer 1. As for black, since the density of the dot-like areas in the halftone image is made lower (i.e., the screen ruling is reduced to make the halftone image coarse) as discussed earlier, occurrence of streak unevenness in the printed halftone image is suppressed at a certain degree.

If dot-like areas are periodically arranged in the halftone image like in the AM screening, a pitch of dot-like areas in the check pattern and that of reading positions in the line sensor interfere and thus data of image including a beat pattern of low frequency is acquired. When each pixel value of the original image is modified on the basis of such image data, a beat pattern appears in the generated halftone image. Conversely, since the plurality of cell centers 731 and 741 are arranged in a random fashion in the matrix area where the threshold matrix used in the printer 1 is generated, it is possible to prevent occurrence of a beat pattern in the halftone image which is caused by modification based on the print densities.

As discussed above, in the color halftone image generated in the printer 1, since the direction where intervals of the cell centers 731 and 741 for cyan are made large and the direction where intervals of the cell centers 731 and 741 for magenta are made large are different from each other and the both directions are tilted relatively to the column direction corresponding to the scan direction of the head 21, it is possible to suppress graininess which appears in an image obtained by superposing the halftone image of cyan and that of magenta and to decrease the degree of modification in modifying the pixel values of the original image on the basis of the print densities, thereby achieving suppression of degradation of the halftone image and prevention of occurrence of streak unevenness. Further, since the cell centers 731 and 741 are arranged in a random fashion in each of cyan and magenta, occurrence of a beat pattern caused by modification based on the print densities is prevented.

Figure 21:
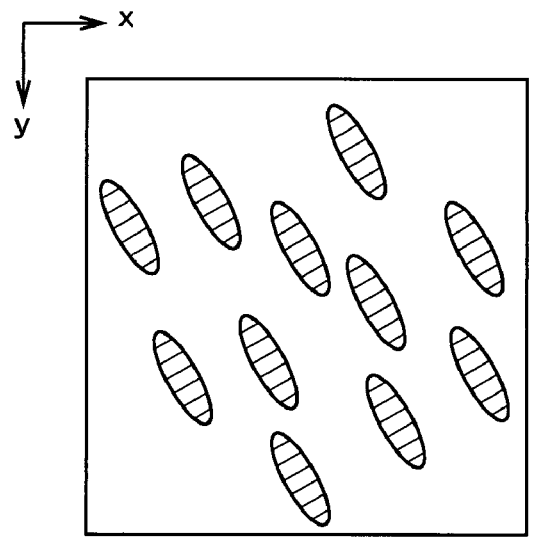
FIG. 21 is a view abstractly showing another example of the check pattern.

Though the angle formed between the direction where the intervals of the cell centers 731 and 741 for cyan are made large and that where the intervals of the cell centers 731 and 741 for magenta are made large is 90 degrees in the above threshold matrixes of cyan and magenta and the angle formed between the column direction and each of the directions is 45 degrees, there may be a case where the plurality of cell centers are arranged so that directions, where averages of intervals of the cell centers for cyan and magenta are maximum, should counterclockwise tilt by 15 degrees and clockwise by 15 degrees with respect to the column direction, respectively. In this case, in the check pattern with a predetermined gray level generated by using the threshold matrix for cyan, the dot-like areas each have a shape being elongated in a direction which is counterclockwise tilted by 15 degrees with respect to the column direction as abstractly shown in FIG. 21, and it is possible to decrease the degree of modification in modifying the pixel values of the original image on the basis of the print densities at a certain degree and suppress degradation of the halftone image while preventing occurrence of streak unevenness (the same as in magenta). In general, graininess in the color halftone image with two color components is suppressed if directions where dot-like areas are elongated are different by 30 degrees or more.

As discussed above, in order to both decrease the degree of modification in modifying the pixel values of the original image on the basis of the print densities and surely reduce graininess in the halftone image, it is preferable that the angle formed between the column direction and each of the first direction where the intervals of the cell centers for cyan are maximum and the second direction where the intervals of the cell centers for magenta are maximum is equal to or larger than 15 degrees (more preferably, equal to 45 degrees), and the angle formed between the first direction and the second direction is equal to or larger than 30 degrees (more preferably, it is 90 degrees) (the same as in a case of modifying the threshold matrix which is discussed later). Though a range taken by the angle formed between the two directions is considered as 0 to 90 degrees, if the range taken by the angle formed between the two directions is considered as 0 to 180 degrees, it is preferable that the angle formed between the column direction and each of the first direction where the intervals of the cell centers for cyan are maximum and the second direction where the intervals of the cell centers for magenta are maximum is equal to or larger than 15 degrees and equal to or smaller than 165 degrees, and the angle formed between the first direction and the second direction is equal to or larger than 30 degrees and equal to or smaller than 150.

Figure 22:
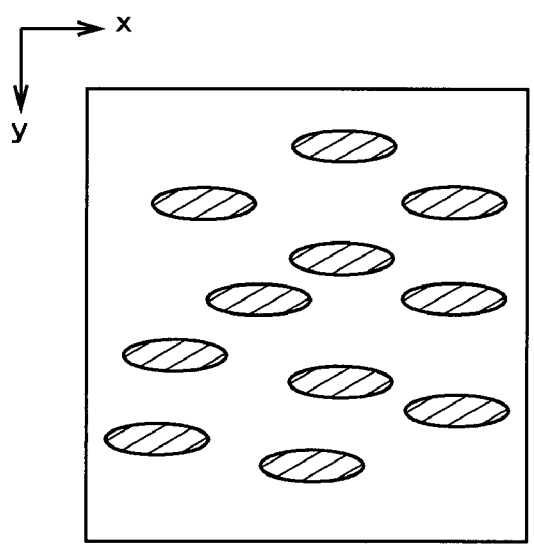
FIG. 22 is a view abstractly showing still another example of the check pattern.

In a case where the plurality of cell centers are arranged so that the directions where the intervals of the cell centers for cyan and magenta are maximum should be along the row direction, the dot-like areas each have a shape being elongated in the row direction in the check pattern with a predetermined gray level as abstractly shown in FIG. 22 and the degree of modification in modifying the pixel values of the original image on the basis of the print densities can be more decreased. However in this case, since the direction where the dot-like areas are elongated is the same in both cyan and magenta, such arrangement of the cell centers is not preferable from the viewpoint of reducing graininess in the halftone image.

Figure 23:
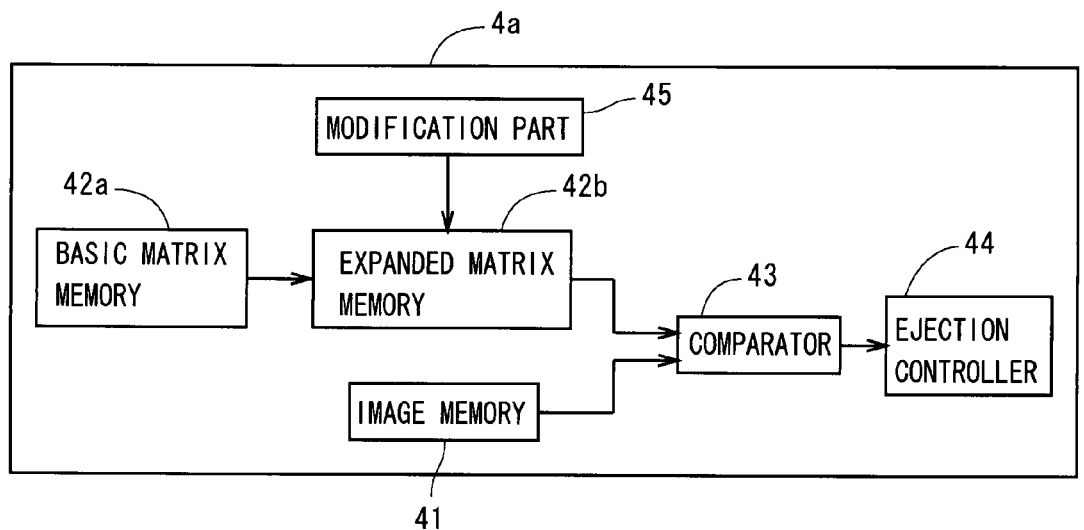
FIG. 23 is a block diagram showing a functional constitution of a printer in accordance with another example.

Next discussion will be made on another example of the printer 1. FIG. 23 is a block diagram showing only a functional constitution corresponding to the main body control part 4 in FIG. 4 in a printer 1 in accordance with the another example. In a main body control part 4a of FIG. 23, a basic matrix memory 42a and an expanded matrix memory 42b are provided instead of the matrix memory 42 in FIG. 4, and the expanded matrix memory 42b is connected to the modification part 45 and the comparator 43. Though FIG. 23 shows the basic matrix memory 42a and the expanded matrix memory 42b for one color component, these constituent elements are actually provided in each of a plurality of color components (the same as in main body control parts 4b and 4c in FIGS. 24 and 25 which are discussed later).

The threshold matrix is modified based on print densities in a printing operation in the printer 1 having the functional constitution of FIG. 23. Specifically, first, when a threshold matrix (it is a basis of the threshold matrix which is used in actual halftoning as discussed later, hereinafter referred to as "basic threshold matrix". This is also applied to an operation example in accordance with the main body control part 4c of FIG. 25 discussed later.) is stored in the basic matrix memory 42a in the pre-printing process, the basic threshold matrix for each color component is repeatedly arranged (tiled) in the row direction, similarly to the plurality of repeat areas 71 arranged in the x direction (row direction) of FIG. 6, and thereby an expanded matrix which has the same size as the original image with respect to the row direction is stored and prepared in the expanded matrix memory 42b (FIG. 7: Steps S21a, S21b, S21c). In the main body control part 4a of FIG. 23, since the expanded matrix is used in actual halftoning, the expanded matrix is referred to as "threshold matrix" in the description of the present operation example.

Subsequently, a predetermined check pattern for each color is printed on the printing paper 9 with use of the threshold matrix, each check pattern is read out across the whole in the width direction by the line sensor 24, and then print densities in respective positions in the width direction of the check pattern are acquired on the basis of an image representing the check pattern. A modification coefficient (Coeff) for each position in the width direction is obtained by Eq. 2 in the modification coefficient calculation part 52 (see FIG. 4), where $H_{AVE}$ is an average value of print densities in a plurality of positions (typically all positions) in the width direction, $\sigma$ is a standard deviation of the print densities, and $H_i$ is a print density in the position in the width direction. In Eq. 2, a is a positive constant.

$$\text{Coeff}=(255+(H_i-H_{AVE})/\sigma\times a)/255 \qquad \text{Eq. 2}$$

For example, in a case where the average value of the print densities is 192 and the standard deviation is 1.5, the modification coefficient (Coeff) obtained by Eq. 2 becomes greater than 1 at a position in the width direction where the print density is 198 (i.e., the print density is higher than the average value). At a position in the width direction where the print density is lower than the average value, the modification coefficient (Coeff) obtained by Eq. 2 is smaller than 1. As discussed above, respective check patterns of black, cyan, and magenta are printed in the printer 1, a plurality of modification coefficients of each of black, cyan, and magenta are acquired by measuring the print densities (Steps S22a, S22b, S22c), and then the modification coefficients of each color component are stored in the modification coefficient calculation part 52 and the pre-printing process is completed.

Figure 5:
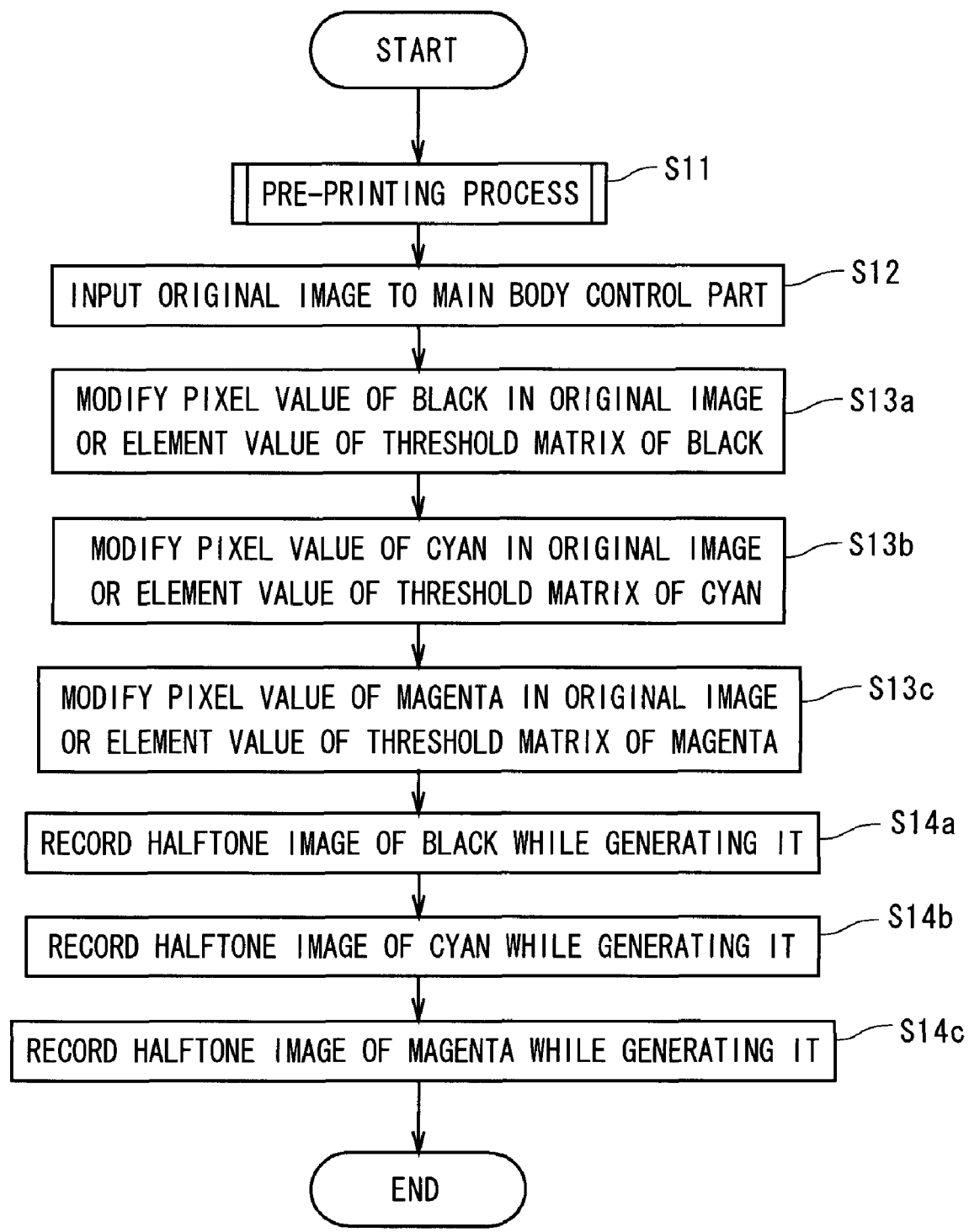
FIG. 5 is a flowchart showing an operation flow for printing an image in the printer.

After completion of the pre-printing process (FIG. 5: Step S11), a color original image is inputted to the image memory 41 (Step S12). Subsequently, the plurality of modification coefficients stored in the modification coefficient calculation part 52 are outputted to the modification part 45, and all element values in the threshold matrix stored in the expanded matrix memory 42b are modified by multiplying each element value in the threshold matrix in the expanded matrix memory 42*b* by a modification coefficient for the position in the width direction corresponding to the element value, with respect to each color component (Steps S13*a*, S13*b*, S13*c*). Then, each pixel value of the original image is compared with the corresponding element value of the threshold matrix after modification (the modified threshold matrix), parts of a halftone image representing the original image is sequentially generated, and the generated part of the halftone image is printed on the printing paper 9 (Steps S14*a*, S14*b*, S14*c*).

In this time, at a position in the width direction where the print density is larger than the average value in the check pattern, the density of the position in the width direction needs to be made lower in printing the image. However, since each element value of the threshold matrix corresponding to the position in the width direction is modified so as to be greater than the original element value, a possibility of ejection of ink to the position in the width direction on the printing paper 9 in printing of the image becomes small. Therefore, the density of the position in the row direction is practically decreased in a halftone image (printed image) which is actually printed on the printing paper 9. On the other hand, at a position in the width direction where the print density is smaller than the average value in the check pattern, since each element value of the threshold matrix corresponding to the position is modified so as to be smaller than the original element value, the density of the position in the row direction is practically increased in the halftone image.

As discussed above, the threshold matrix having the same size as the original image with respect to the row direction is prepared for each color component in the printer 1 having the functional constitution of FIG. 23, each element value of the threshold matrix is modified by using the modification coefficient in advance, and occurrence of streak unevenness extending in the scan direction caused by variations in the outlets 231 of the head 21 or the like is prevented in the halftone image recorded on the printing paper 9. Since the threshold matrix is derived from the above basic matrix generated in the process of FIG. 10, graininess can be reduced in the color halftone image while preventing appearance of a beat pattern. The modified threshold matrix can be used in printing of another original image and in this case, the operations in Steps S13*a* to S13*c* of FIG. 5 are omitted in printing of the original image (the same as in a printer of FIG. 25 which is discussed later).

Figure 24:
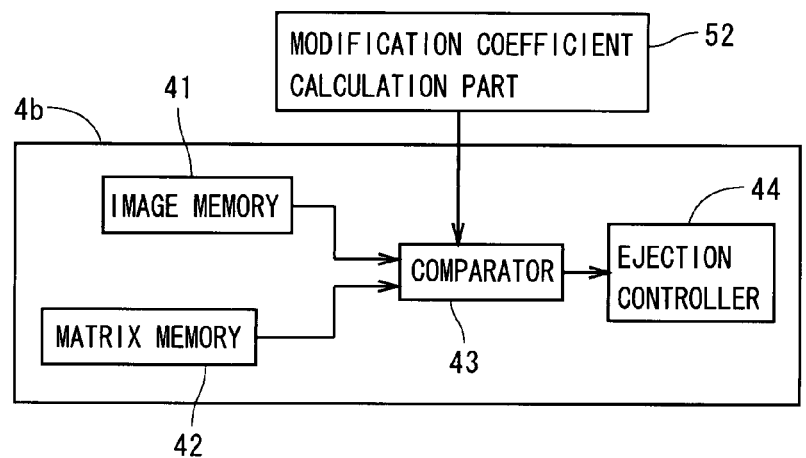
FIGS. 24 and 25 are block diagrams each showing a functional constitution of a printer in accordance with still another example.

Next discussion will be made on still another example of the printer 1. FIG. 24 is a block diagram showing only a functional constitution corresponding to the main body control part 4 in FIG. 4 of the printer 1 in accordance with the still another example. In the main body control part 4*b* of FIG. 24, the modification part 45 is omitted and the modification coefficient calculation part 52 is connected to the comparator 43.

In a printing operation in the printer having the functional constitution of FIG. 24, with respect to each color component, the operation where each pixel value of the original image is modified in Steps S13*a* to S13*c* of FIG. 5 is performed in parallel with a part of the operation where printing is performed while generating the halftone image in Steps S14*a* to S14*c*. Specifically, after the color original image is inputted to the image memory 41 (Step S12), each pixel value of the original image, the corresponding element value of the threshold matrix, and the corresponding modification coefficient in each color component are inputted to the comparator 43 from the image memory 41, the matrix memory 42, and the modification coefficient calculation part 52, respectively. A lookup table which is capable of specifying a product of the pixel value of the original image and the modification coefficient by using these values is stored in the comparator 43 in advance, and a pixel value after modification (the modified pixel value) is acquired by referring to the lookup table on the basis of the (original) pixel value and the modification coefficient which are inputted. Parts of halftone images representing the original image are generated in turn by comparing the modified pixel value with the element value of the threshold matrix, and generated parts of the halftone images are sequentially printed on the printing paper 9 (Steps S13*a* to S13*c*, S14*a* to S14*c*).

As discussed above, in the printer 1, the operation where each pixel value of the original image 70 is modified is performed in parallel with a part of the operation where printing is performed while generating the halftone image, with respect to each of the plurality of color components. With this operation, in a case where the original image without modification needs to be stored, each pixel value of the original image can be modified in real time without preparing a large memory area for the modified original image. In the printer 1, the operation where each pixel value of the original image is modified and the operation where printing is performed while generating the halftone image are performed in parallel, while treating a pixel group of a predetermined size in the original image as a unit of process, but these operations may be performed in parallel while treating one pixel in the original image as a unit of process. That is to say, the operation where each pixel value of the original image is modified is performed in parallel with at least a part of the operation where printing is performed while generating the halftone image.

In the printer 1 having the functional constitution of FIG. 24, a lookup table which is capable of specifying a product of the element value of the threshold matrix and the modification coefficient by using these values may be prepared in the comparator 43 in advance. In this case, a modified element value is acquired by referring to the lookup table on the basis of the (original) element value and the modification coefficient which are inputted, and the halftone image representing the original image is generated by comparing the modified element value with the pixel value of the original image. In this way, the operation where each element value of the threshold matrix is modified is performed in parallel with a part of the operation where printing is performed while generating the halftone image.

Figure 25:
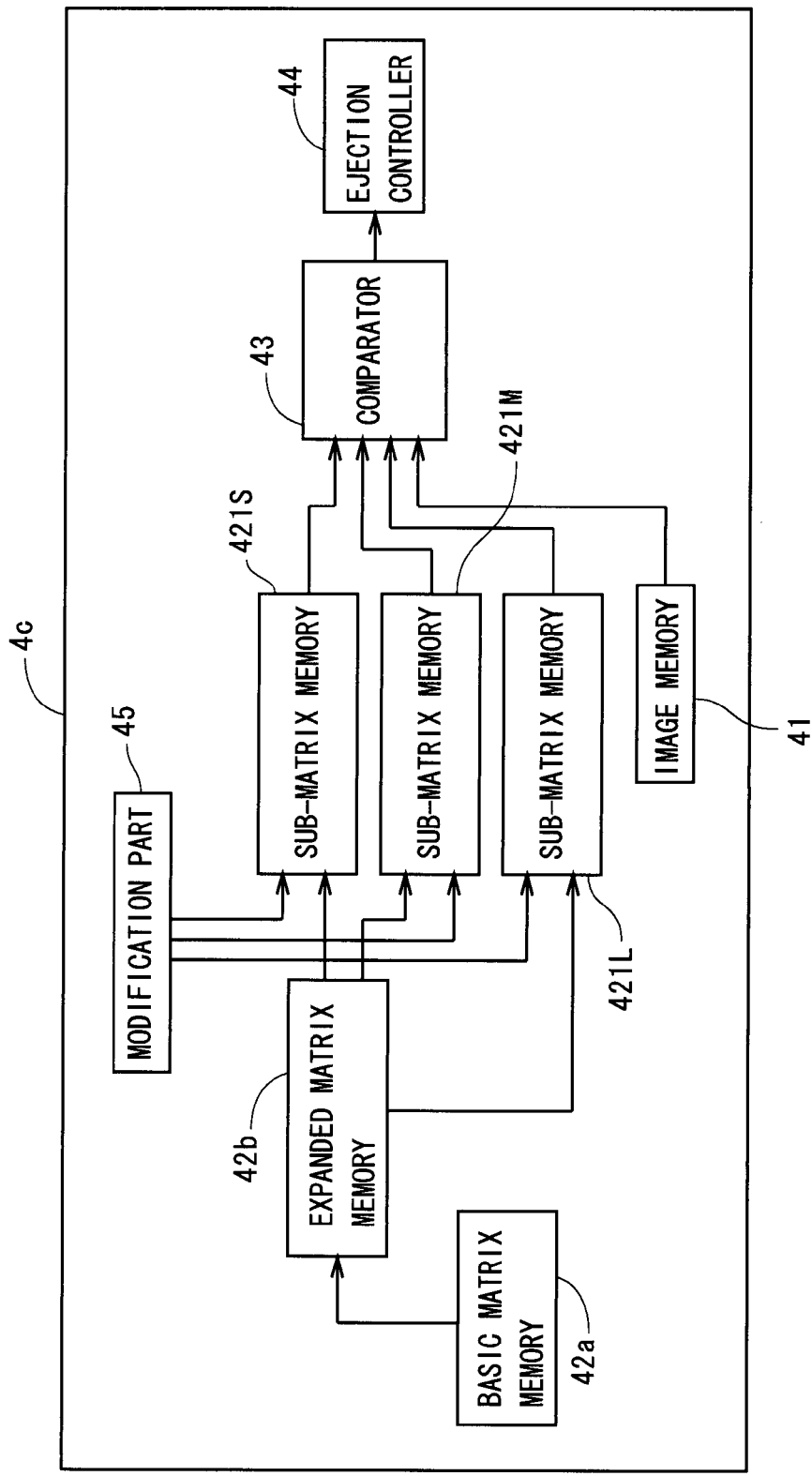

Next discussion will be made on still another example of the printer 1. FIG. 25 is a block diagram showing only a functional constitution corresponding to the main body control part 4 in FIG. 4 of a printer 1 in accordance with still another example. In the main body control part 4*c* of FIG. 25, three sub-matrix memories 421S, 421M and 421L are provided between the expanded matrix memory 42*b* and the comparator 43 of the main body control part 4*a* in FIG. 23, and the modification part 45 is connected to the sub-matrix memories 421S, 421M and 421L. Each outlet 231 in the head 21 can form a plurality of dots having different sizes by ejecting different amounts of droplets, and a dot of S size which is the smallest one, a dot of M size which is larger than S size, and a dot of L size which is larger than M size can be formed in the present operation example.

The threshold matrix used in actual printing in the operation example is made the same size as the original image with respect to the row direction, and each element value of the threshold matrix is a set of a sub-element value used for determining necessity of formation of a dot with S size, a sub-element value used for determining necessity of formation of a dot with M size, and a sub-element value used for determining necessity of formation of a dot with L size. In the main body control part 4*c* of FIG. 25, the threshold matrix is divided into a sub-threshold matrix which is a two-dimensional array of the sub-element values for S size, a sub-threshold matrix which is a two-dimensional array of the sub-element values for M size, and a sub-threshold matrix which is a two-dimensional array of the sub-element values for L size, and these sub-threshold matrixes are stored in the sub-matrix memories 421S, 421M, and 421L, respectively. Out of the mutually corresponding sub-element values in the sub-threshold matrixes, the smallest value is in the sub-threshold matrix for S size and the largest value is in the sub-threshold matrix for L size. The sub-threshold matrix will be described later.

In the printer 1 having the main body control part 4$c$ of FIG. 25, all sub-element values of each sub-threshold matrix are modified by multiplying each sub-element value of the sub-threshold matrix by a modification coefficient for the position in the width direction corresponding to the sub-element value, with respect to each of a plurality of color components, similarly to the case in the main body control part 4$a$ of FIG. 23 (FIG. 5: Steps S13$a$ to S13$c$). In generation of a halftone image for each color component, first, a pixel value of each pixel in the original image is compared with a sub-element value of the sub-threshold matrix for S size corresponding to the pixel value. Comparison of the pixels in the original image is actually performed one by one, however conceptually, in the original image, pixels at the positions where the pixel values are larger than the corresponding sub-element values of the sub-threshold matrix for S size, for example, are assigned the pixel values "1" and the remaining pixels are assigned the pixel values "0", to generate a provisional outputted image. Subsequently, the pixel value of each pixel in the original image is compared with the corresponding sub-element value of the sub-threshold matrix for M size, and pixels in the outputted image at the positions where the pixel values are larger than the corresponding sub-element values of the sub-threshold matrix are changed to the pixel values "2" and the remaining pixels keep the pixel values as is, to modify the provisional outputted image. Then, the pixel value of each pixel in the original image is compared with the corresponding sub-element value of the sub-threshold matrix for L size, and pixels in the outputted image at the positions where the pixel values are larger than the corresponding sub-element values of the sub-threshold matrix are changed to the pixel values "3" and the remaining pixels keep the pixel values as is, to acquire a quaternary outputted image, which is comparison results between the pixel values of the original image and the corresponding element values of the expanded matrix, as a halftone image. As discussed later, since the pixel values "1", "2" and "3" in the outputted image indicate the size of dot which is formed on the printing paper 9 by the corresponding outlet 231, the halftone image is substantially a halftone image represented by the absence or presence of dot (and size of dot).

As discussed earlier, out of the corresponding sub-element values, the smallest one is in the sub-threshold matrix for S size and the largest one is in the sub-threshold matrix for L size in the printer 1 in accordance with the present operation example. Thus, in comparison between the original image and the sub-threshold matrix for S size, when a pixel value of a pixel in the original image is equal to or smaller than the corresponding sub-element value of the sub-threshold matrix, the pixel value is always equal to or smaller than the corresponding sub-element values of the sub-threshold matrix for M size and the sub-threshold matrix for L size. When a pixel value of a pixel in the original image is equal to or smaller than the corresponding sub-element value of the sub-threshold matrix for M size, the pixel value is always equal to or smaller than the corresponding sub-element value of the sub-threshold matrix for L size. Comparing such pixel values of pixels in the original image with the corresponding sub-element values of the sub-threshold matrixes for M and L sizes may be omitted.

In the printer 1, with respect to each color component, the process for printing generated parts of the halftone images is performed while generating the halftone image as discussed above (Steps S14$a$ to S14$c$). In printing the halftone image, in synchronization with movement of the printing paper 9 relative to the head 21, in the ejection controller 44, when a pixel value in the halftone image corresponding to an ejection position of each outlet 231 on the printing paper 9 is "1", a dot of S size is formed on the ejection position, and when the pixel value in the halftone image is "2", a dot of M size is formed on the ejection position. Also, when the pixel value in the halftone image is "3", a dot of L size is formed on the ejection position, and when the pixel value in the halftone image is "0", a dot is not formed on the ejection position. In this way, in synchronization with movement of the printing paper 9 relative to the head 21 (scanning of the plurality of ejection positions on the printing paper 9 associated with the plurality of outlets 231, respectively), ejection of ink from the plurality of outlets 231 is controlled in accordance with comparison results between the pixel values of the original image at the ejection positions of the plurality of outlets 231 relative to the printing paper 9 and the element values of the threshold matrix corresponding to the pixel values, to print a color halftone image on the printing paper 9.

Next discussion will be made on a technique of generating the sub-threshold matrix for one color component. The sub-threshold matrixes for the other color components are generated in the same manner.

In the printer 1, an expanded matrix having the same size as the original image with respect to the row direction is generated by tiling the basic matrix, similarly to the case of the operation example in accordance with the main body control part 4$a$ of FIG. 23. Subsequently, a matrix where a quotient obtained by dividing a value of each element in the expanded matrix by 2 is used as a new value of the element is generated as a sub-threshold matrix for formation of dot with S size. In the sub-threshold matrix for formation of dot with S size, a value of each element is one of 0 to 127. The value 64 which is 25% of 256 gray levels in the original image is added to the value of each element of the sub-threshold matrix for formation of dot with S size to generate a sub-threshold matrix for formation of dot with M size, and the value 128 which is 50% of 256 gray levels in the original image is added to the value of each element of the sub-threshold matrix for formation of dot with S size to generate a sub-threshold matrix for formation of dot with L size. A value of each element in the sub-threshold matrix for formation of dot with M size is one of 64 to 191 and a value of each element in the sub-threshold matrix for formation of dot with L size is one of 128 to 255. In this way, the expanded matrix is converted to generate the sub-threshold matrix for formation of dot with S size, the sub-threshold matrix for formation of dot with M size, and the sub-threshold matrix for formation of dot with L size.

Figure 26:
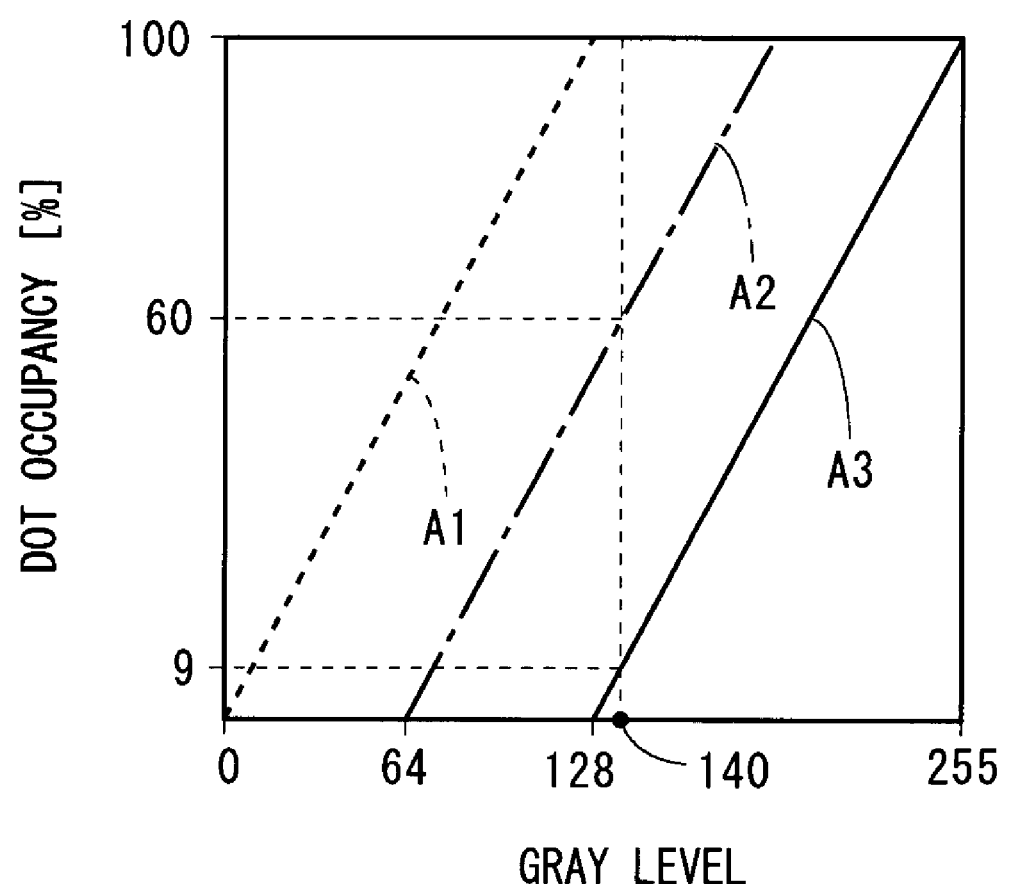
FIG. 26 is a graph for explaining characteristics of sub-threshold matrixes.

Here, discussion will be made on the characteristics of the sub-threshold matrixes. FIG. 26 is a graph for explaining the characteristics of the sub-threshold matrixes. In FIG. 26, the vertical axis shows a proportion of the number of dots with each size formed on the printing paper 9 relative to the number of all pixels, in a case where an image with a uniform gray level is printed with use of only the sub-threshold matrix for that size in the printer 1 (hereinafter, the proportion is referred to as "dot occupancy"), and the horizontal axis shows a gray level of the image in this case. In FIG. 26, a broken line A1 is a dot occupancy in the case of using the sub-threshold matrix for S size, a one-dot chain line A2 is that in the case of using the sub-threshold matrix for M size, and a solid line A3 is that in the case of using the sub-threshold matrix for L size.

As shown in FIG. 26, in the case of the sub-threshold matrix for S size, the dot occupancy linearly increases from 0 to 100% as the gray level of the image increases from 0 to 128, and the dot occupancy keeps 100% at a gray level of 128 or more. In the case of the sub-threshold matrix for M size, the dot occupancy is 0% at a gray level of the image which is equal to or smaller than 64, it linearly increases from 0 to 100% as the gray level increases from 64 to 192, and it keeps 100% at a gray level of 192 or more. In the case of the sub-threshold matrix for L size, the dot occupancy is 0% at a gray level of the image which is equal to or smaller than 128, and it linearly increases from 0 to approximately 100% as the gray level increases from 128 to 255.

For example, looking at a gray level of 140, the dot occupancy in the sub-threshold matrix for L size is 9%, that in the sub-threshold matrix for M size is 60%, and that in the sub-threshold matrix for S size is 100%, as shown in FIG. 26. As discussed above, the dots with the different sizes are not formed on the same position in the actual printing and the dot with larger size is formed on a preferential basis. In the sub-threshold matrixes for S, M, and L sizes, out of the values (the sub-element values) in the same position, the largest one is in the sub-threshold matrix for L size and the smallest one is in the sub-threshold matrix for S size. Under the above-discussed assumption that the image with the uniform gray level is printed with use of only the sub-threshold matrix for each size (i.e., an image formed only by dots with S size, an image formed only by dots with M size, and an image formed only by dots with L size are printed), a dot is certainly formed with use of the sub-threshold matrixes for each of M and S sizes in each position where a dot is formed with use of the sub-threshold matrix with L size, and a dot is certainly formed with use of the sub-threshold matrix for S size in each position where a dot is formed with use of the sub-threshold matrix with M size. Therefore, if an image with a uniform gray level of 140 is printed with use of a set of the sub-threshold matrixes in the printer 1, the dot occupancy of L size is 9%, that of M size is 51% (which is calculated by (60−9)), and that of S size is 40% (which is calculated by (100−60)). Since the original image actually has a tone (i.e., portions of various gray levels) and each pixel value is compared with the sub-element values in the corresponding position of the sub-threshold matrixes, dots with S, M, and L size are stochastically formed in printing in accordance with the graph of FIG. 26 by using the threshold matrix where each element value is a set of the sub-element values.

As discussed above, in the printer 1 having the main body control part 4c of FIG. 25, the threshold matrix where each element value is a set of the sub-element values for determining necessity of formation of dots with S, M, and L sizes is modified on the basis of the print densities of the check pattern and thereby occurrence of streak unevenness caused by variations in the outlets 231 is prevented in the printed halftone image. Though streak unevenness generally tends to appear also in a case where printing is performed by only dots with a relatively small diameter, since the dots with the different sizes are stochastically mixed in the halftone image in the printer 1, it is possible to prevent occurrence of streak unevenness which appears in a case that dots in a printed halftone image have a uniform size. Since the threshold matrix (the sub-threshold matrix) for each color component is derived from the above-discussed basic matrix generated in the process of FIG. 10, it is possible to achieve reduction of graininess in the color halftone image and prevention of appearance of a beat pattern. In the printer 1 having the main body control part 4c of FIG. 25, a pixel value of each pixel in the original image may be modified for each color component.

Though the preferred embodiment of the present invention has been discussed above, the present invention is not limited to the above-discussed preferred embodiment, but allows various variations.

The technique of recording an image with modification of the original image or the threshold matrix on the basis of the print densities is particularly suitable for an inkjet printer which has a head having a plurality of outlets for each color component used for recording dots to a plurality of ejection positions, respectively, arranged in a width direction on a printing paper and a scanning mechanism for moving the plurality of ejection positions on the printing paper relatively to the printing paper in a scan direction perpendicular to the width direction. The technique can be applied to other image recording apparatuses for making a printed material, such as an electrophotographic printer or a plate-making apparatus for CTP (Computer To Plate).

For example, the electrophotographic printer is provided with a head having a plurality of light emitting elements (e.g., semiconductor lasers or light emitting diodes (LED)) and a photosensitive drum where a photosensitive material is formed on its outer surface. A plurality of light irradiation positions on the photosensitive material, which are respectively irradiated with a plurality of light beams outputted from the head, move in a direction (scan direction) along a rotation axis of the photosensitive drum by a polygon mirror which is rotated in the head, and an image of a plurality of lines is recorded on the photosensitive material with one scan of the plurality of light irradiation positions. The plurality of light irradiation positions move (sub-scan) relatively to the photosensitive material in a direction corresponding to a circumferential direction of the photosensitive drum by rotation of the photosensitive drum. In the printer, an electrostatic latent image of the first color component is formed (i.e., a halftone image of the first color component is recorded) on the photosensitive material, the electrostatic latent image is expanded by toner of the first color component, and then a toner image is transferred onto a printing paper. Subsequently, an electrostatic latent image of the second color component is formed (i.e., a halftone image of the second color component is recorded) on the photosensitive material, the electrostatic latent image is expanded by toner of the second color component, and a toner image is transferred on the printing paper, to print a color halftone image on the printing paper. As discussed above, in the electrophotographic printer, the photosensitive material of the photosensitive drum is used as an object where dots (elements of the electrostatic latent image) are recorded by irradiation with light from the head, and the halftone image is printed on the printing paper by using the photosensitive material where the electrostatic latent image, which is a group of dots, is recorded. There may be a case where the head and the photosensitive drum are regarded as one unit, and a plurality of units are arranged to print the color halftone image on the printing paper. In this case, a group of the photosensitive materials on the plurality of photosensitive drums is considered as an object for image recording.

When modification coefficients of each color component used for the original image or the threshold matrix are acquired in the electrophotographic printer, after recording an electrostatic latent image of a check pattern on the photosensitive material, the electrostatic latent image is expanded by toner and a toner image is transferred on the printing paper, to measure print densities of an image on the printing paper. In this manner, print densities in a plurality of positions in a direction perpendicular to the scan direction are measured in the check pattern on a material printed by using the photosensitive material, to acquire a plurality of modification coefficients for the plurality of positions. Then, when a halftone image of each color component in the original image is actually recorded on the photosensitive material, the original image or the threshold matrix is modified by using the modification coefficients, thereby printing a preferable halftone image on the printing paper.

The plate-making apparatus is provided with a head having a light source and a spatial light modulator and a drum which is wound with a printing plate. A plurality of light irradiation positions on the printing plate, which are respectively irradiated with a plurality of light beams outputted from the head, are arranged in a direction along a rotation axis of the drum. The plurality of light irradiation positions move in a circumferential direction (scan direction) of the drum relatively to the printing plate by rotation of the drum, to record a halftone image, which is a group of dots, on the printing plate. In the plate-making apparatus, a halftone image of the first color component is recorded on a printing plate of the first color component with the above operation, the printing plate on the drum is replaced with a printing plate of the second color component, and then a halftone image of the second color component is recorded on the printing plate of the second color component, similarly to the above operation. As described above, the plate-making apparatus is an image recording apparatus for recording an image on an object, where a set of the printing plate on which the halftone image of the first color component is recorded and the printing plate on which the halftone image of the second color component is recorded is used as the object. Printing is performed in another apparatus by using these printing plates, and a color halftone image is printed on the printing paper.

When modification coefficients of each color component used for the original image or the threshold matrix are acquired in the plate-making apparatus, a check pattern is actually recorded on the printing plate, and print densities of an image on the printing paper which is printed with use of the above printing plate are measured. In this manner, print densities in a plurality of positions in (a direction corresponding to) a direction perpendicular to the scan direction are measured in the check pattern on a material printed by using the printing plate, to acquire a plurality of modification coefficients for the plurality of positions. Then, when an original image of each color component is actually recorded on the printing plate, the original image or the threshold matrix is modified by using the modification coefficients, thereby printing a preferable halftone image on the printing paper.

As discussed above, the technique of recording an image with modification of the original image or the threshold matrix on the basis of the print densities in the above preferred embodiment can be used for various image recording apparatuses each of which comprises a head having a plurality of dot output elements for recording dots to a plurality of dot recording positions, respectively, arranged in a width direction perpendicular to a predetermined scan direction on an object to be printed or an object used in printing and a scanning mechanism for moving the plurality of dot recording positions on the object relatively to the object in the scan direction.

In the image recording apparatus, prepared are a first threshold matrix which is generated in the matrix area by setting a plurality of first halftone cells based on a plurality of first base points, intervals of the plurality of first base points being maximum with respect to a first direction tilted relatively to a column direction corresponding to a scan direction, the plurality of first base points being arranged randomly, and a second threshold matrix which is generated in the matrix area by setting a plurality of second halftone cells based on a plurality of second base points, intervals of the plurality of second base points being maximum with respect to a second direction which is tilted relatively to the column direction and is different from the first direction, the plurality of second base points being arranged randomly. A predetermined pattern is recorded on an object with use of the threshold matrix of each color component by the head and print densities in a plurality of positions in the width direction of the predetermined pattern on the object or a material (a printer material) printed by using the object are measured, to acquire a plurality of modification coefficients for the plurality of positions in the width direction. Then, element values of the threshold matrix of each color component or pixel values of each color component in the original image are modified by using the modification coefficients, and output control of the plurality of dot output elements for the color component is performed in accordance with comparison results between respective pixel values of the color component in the original image and element values of the threshold matrix of the color component corresponding to the respective pixel values, while moving a plurality of dot recording positions for the color component relatively to an object to be printed or an object used in printing in the scan direction, to record a color halftone image representing the color original image. As a result, it is possible to print a color halftone image with less graininess on the object, without causing a beat pattern and streak unevenness or to generate an object which is capable of printing a color halftone image with less graininess, without causing a beat pattern and streak unevenness.

The cell centers distinguished between the shadow-side and the highlight-side are not necessarily used in generation of the threshold matrix. There may be a case where cell centers without a distinction between the shadow-side and the highlight-side are arranged in the matrix area, halftone cells based on the cell centers are set, and then threshold values are set so that a halftone dot area grows in each halftone cell in accordance with increase in all the gray levels.

In the printer 1 of FIG. 1, by only one scan of the head 21 relative to the printing paper 9, printing of an image on an area passed by the head 21 is completed, however in the printer, in a dot group which is (virtually) formed with one scan by each outlet 231 and is dots arranged in the scan direction in a line, interlace printing where a dot is formed between adjacent dots by another outlet 231 may be performed, or, in a plurality of dot groups arranged in the width direction, interlace printing where another main scanning of the head 21 interpolates between adjacent dot groups may be performed. Also in this case, the original image or the threshold matrix is modified on the basis of print densities and it is therefore possible to prevent occurrence of streak unevenness in a printed halftone image.

Although the original image or the threshold matrix is modified by multiplying each pixel value of the original image or each element value of the threshold matrix by the corresponding modification coefficient in the preferred embodiment, there may be a case where, depending on a calculation technique of the modification coefficient, the shading compensation is reflected on the original image or the threshold matrix by dividing the pixel value or the element value by the modification coefficient, adding the modification coefficient to the pixel value or the element value, or subtracting the modification coefficient from the pixel value or the element value. In other words, the pixel values of the original image or the element values of the threshold matrix can be modified by various technique using the plurality of modification coefficients.

The feeder 3 functions as a scanning mechanism for moving the ejection position of ink on the printing paper 9 in the scan direction in the printer 1 of FIG. 1, but a mechanism for moving the head 21 in the scan direction may be provided.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2006-260159 filed in the Japan Patent Office on Sep. 26, 2006, the entire disclosure of which is incorporated herein by reference.

What is claimed is:

1. An image recording method of recording a halftone image representing a color original image by comparing said original image with a threshold matrix for each color component in an image recording apparatus comprising a head having a plurality of dot output elements for recording dots to a plurality of dot recording positions, respectively, arranged in a width direction perpendicular to a predetermined scan direction on an object to be printed or an object used in printing and a scanning mechanism for moving said plurality of dot recording positions on said object relatively to said object in said scan direction, comprising the steps of:

a) preparing a first threshold matrix of a first color component which is generated in a matrix area of said first color component by setting a plurality of first halftone cells based on a plurality of first base points and setting threshold values so that halftone dot areas grow in accordance with shapes of said plurality of first halftone cells with increase of gray level of said first color component, said matrix area of said first color component being defined in a column direction corresponding to said scan direction and a row direction corresponding to said width direction, an average of intervals of said plurality of first base points being maximum with respect to a first direction tilted relatively to said column direction and being minimum with respect to a direction orthogonal to said first direction, said plurality of first base points being arranged randomly;

b) preparing a second threshold matrix of a second color component which is generated in a matrix area of said second color component by setting a plurality of second halftone cells based on a plurality of second base points and setting threshold values so that halftone dot areas grow in accordance with shapes of said plurality of second halftone cells with increase of gray level of said second color component, said matrix area of said second color component being defined in said column direction and said row direction, an average of intervals of said plurality of second base points being maximum with respect to a second direction which is tilted relatively to said column direction and is different from said first direction and being minimum with respect to a direction orthogonal to said second direction, said plurality of second base points being arranged randomly;

c) recording a predetermined pattern on an object with use of said first threshold matrix by said head and measuring print densities in a plurality of positions in said width direction of said predetermined pattern on said object or a material printed by using said object, to acquire a plurality of first modification coefficients for said plurality of positions;

d) recording a predetermined pattern on an object with use of said second threshold matrix by said head and measuring print densities in a plurality of positions in said width direction of said predetermined pattern on said object or a material printed by using said object, to acquire a plurality of second modification coefficients for said plurality of positions;

e) modifying element values of said first threshold matrix or pixel values of said first color component in said original image by using said plurality of first modification coefficients;

f) modifying element values of said second threshold matrix or pixel values of said second color component in said original image by using said plurality of second modification coefficients;

g) performing output control of a plurality of dot output elements for said first color component in accordance with comparison results between respective pixel values of said first color component in said original image and element values of said first threshold matrix corresponding to said respective pixel values, while moving a plurality of dot recording positions for said first color component relatively to an object to be printed or an object used in printing in said scan direction; and h) performing output control of a plurality of dot output elements for said second color component in accordance with comparison results between respective pixel values of said second color component in said original image and element values of said second threshold matrix corresponding to said respective pixel values, while moving a plurality of dot recording positions for said second color component relatively to said object in said scan direction.

2. The image recording method according to claim 1, wherein an angle formed between said column direction and each of said first direction and said second direction is equal to or larger than 15 degrees and an angle formed between said first direction and said second direction is equal to or larger than 30 degrees.

3. The image recording method according to claim 2, wherein an angle formed between said column direction and each of said first direction and said second direction is 45 degrees.

4. The image recording method according to claim 1, wherein each of said plurality of dot output elements for each color component can form a plurality of dots having different sizes, and each element value of said first threshold matrix and said second threshold matrix is a set of sub-element values used for determination of a size of a dot.

5. The image recording method according to claim 1, wherein element values of said first threshold matrix are modified by using said plurality of first modification coefficients in said step e); and element values of said second threshold matrix are modified by using said plurality of second modification coefficients in said step f).

6. The image recording method according to claim 5, wherein
said step e) is performed in parallel with at least a part of said step g) and said step f) is performed in parallel with at least a part of said step h).

7. The image recording method according to claim 1, wherein
pixel values of said first color component in said original image are modified by using said plurality of first modification coefficients in said step e); and
pixel values of said second color component in said original image are modified by using plurality of second modification coefficients in said step f).

8. The image recording method according to claim 7, wherein
said steps e) is performed in parallel with at least a part of said step g) and said step f) is performed in parallel with at least a part of said step h).

9. An image recording apparatus for recording a halftone image representing a color original image by comparing said original image with a threshold matrix for each color component, comprising:
a head having a plurality of dot output elements for recording dots to a plurality of dot recording positions, respectively, arranged in a width direction perpendicular to a predetermined scan direction on an object to be printed or an object used in printing;
a scanning mechanism for moving said plurality of dot recording positions on said object relatively to said object in said scan direction;
a first matrix memory for storing a first threshold matrix of a first color component which is generated in a matrix area of said first color component by setting a plurality of first halftone cells based on a plurality of first base points and setting threshold values so that halftone dot areas grow in accordance with shapes of said plurality of first halftone cells with increase of gray level of said first color component, said matrix area of said first color component being defined in a column direction corresponding to said scan direction and a row direction corresponding to said width direction, an average of intervals of said plurality of first base points being maximum with respect to a first direction tilted relatively to said column direction and being minimum with respect to a direction orthogonal to said first direction, said plurality of first base points being arranged randomly;
a second matrix memory for storing a second threshold matrix of a second color component which is generated in a matrix area of said second color component by setting a plurality of second halftone cells based on a plurality of second base points and setting threshold values so that halftone dot areas grow in accordance with shapes of said plurality of second halftone cells with increase of gray level of said second color component, said matrix area of said second color component being defined in said column direction and said row direction, an average of intervals of said plurality of second base points being maximum with respect to a second direction which is tilted relatively to said column direction and is different from said first direction and being minimum with respect to a direction orthogonal to said second direction, said plurality of second base points being arranged randomly;
a modification coefficient acquisition part for measuring print densities in a plurality of positions in said width direction of a predetermined pattern on an object or a material primed by using an object where said predetermined pattern on said object is recorded with use of said first threshold matrix by said head, to acquire a plurality of first modification coefficients for said plurality of positions, and measuring prim densities in a plurality of positions in said width direction of a predetermined pattern on an object or a material printed by using an object where said predetermined pattern on said object is recorded with use of said second threshold matrix by said head, to acquire a plurality of second modification coefficients for said plurality of positions;
a modification part for modifying element values of said first threshold matrix or pixel values of said first color component in said original image by using said plurality of first modification coefficients and modifying element values of said second threshold matrix or pixel values of said second color component in said original image by using said plurality of second modification coefficients; and
a control part for performing output control of a plurality of dot output elements for said first color component in accordance with comparison results between respective pixel values of said first color component in said original image and element values of said first threshold matrix corresponding to said respective pixel values while moving a plurality of dot recording positions for said first color component relatively to an object to be printed or an object used in printing in said scan direction, and performing output control of a plurality of dot output elements for said second color component in accordance with comparison results between respective pixel values of said second color component in said original image and element values of said second threshold matrix corresponding to said respective pixel values while moving a plurality of dot recording positions for said second color component relatively to said object in said scan direction.

10. The image recording apparatus according to claim 9, wherein
an angle formed between said column direction and each of said first direction and said second direction is equal to or larger than 15 degrees and an angle formed between said first direction and said second direction is equal to or larger than 30 degrees.

11. The image recording apparatus according to claim 10, wherein
an angle formed between said column direction and each of said first direction and said second direction is 45 degrees.

12. The image recording apparatus according to claim 9, wherein
each of said plurality of dot output elements for each color component can form a plurality of dots having different sizes, and
each element value of said first threshold matrix and said second threshold matrix is a set of sub-element values used for determination of a size of a dot.

13. The image recording apparatus according to claim 9, wherein
said modification part modifies element values of said first threshold matrix by using said plurality of first modification coefficients and modifies element values of said second threshold matrix by using said plurality of second modification coefficients.

14. The image recording apparatus according to claim 13, wherein
an operation where said modification part modifies element values of said first threshold matrix is performed in parallel with at least a part of an operation where said control part performs output control of said plurality of dot output elements for said first color component, and an operation where said modification part modifies element values of said second threshold matrix is performed in parallel with at least a part of an operation where said control part performs output control of said plurality of dot output elements for said second color component.

15. The image recording apparatus according to claim 9, wherein said modification part modifies pixel values of said first color component in said original image by using said plurality of first modification coefficients and modifies pixel values of said second color component in said original image by using said plurality of second modification coefficients.

16. The image recording apparatus according to claim 15, wherein an operation where said modification part modifies pixel values of said first color component in said original image is performed in parallel with at least a part of an operation where said control part performs output control of said plurality of dot output elements for said first color component, and an operation where said modification part modifies pixel values of said second color component in said original image is performed in parallel with at least a part of an operation where said control part performs output control of said plurality of dot output elements for said second color component.

* * * * *